US011074635B2

(12) United States Patent
Srinivasan et al.

(10) Patent No.: US 11,074,635 B2
(45) Date of Patent: Jul. 27, 2021

(54) REAL-TIME RECOMMENDATION MONITORING DASHBOARD

(71) Applicant: Target Brands, Inc., Minneapolis, MN (US)

(72) Inventors: Aarthi Srinivasan, Los Altos, CA (US); Venkataramana Bantwal Kini, Sunnyvale, CA (US); James Neumann, Minneapolis, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 349 days.

(21) Appl. No.: 15/990,435

(22) Filed: May 25, 2018

(65) Prior Publication Data

US 2019/0362409 A1 Nov. 28, 2019

(51) Int. Cl.
*G06Q 30/00* (2012.01)
*G06Q 30/06* (2012.01)
*G06Q 30/02* (2012.01)
*G06F 3/0484* (2013.01)
*G06F 3/0482* (2013.01)

(52) U.S. Cl.
CPC ..... *G06Q 30/0631* (2013.01); *G06Q 30/0201* (2013.01); *G06F 3/0482* (2013.01); *G06F 3/0484* (2013.01)

(58) Field of Classification Search
None
See application file for complete search history.

(56) References Cited

U.S. PATENT DOCUMENTS 7,617,136 B1 * 11/2009 Lessing ............... G06Q 10/087
705/22
8,468,164 B1 6/2013 Paleja et al.
(Continued)

FOREIGN PATENT DOCUMENTS

JP 2009-129298 A 6/2009
KR 10-2009-0000274 A 1/2009
(Continued)

OTHER PUBLICATIONS

International Search Report and Written Opinion for Application No. PCT/US2019/033819 dated Oct. 1, 2019.
(Continued)

*Primary Examiner* — Gurkanwaljit Singh
(74) *Attorney, Agent, or Firm* — Merchant & Gould P.C.

(57) ABSTRACT

Methods and systems for analyzing and evaluating item recommendations presented on a web site are disclosed. In one aspect, a user interface is generated for display on a website. Item recommendations personalized for an individual user are displayed within in item recommendation region of the website. Impression, clickstream, and sales data are received from user activity on the website. The impression, clickstream, and sales data are displayed on a dashboard of an administrator user interface. An administrator user can select visualizations to display on the dashboard using selectors for impressions, clicks, sales, users, and time. Two or more sets of data can be overlaid to illustrate relationships between user interactions with recommended items and actual sales of those items. The dashboard is dynamically updated in response to new data received from the website in real-time.

14 Claims, 19 Drawing Sheets

(56) References Cited

U.S. PATENT DOCUMENTS

| | | | |
|---|---|---|---|
| 9,420,319 B1* | 8/2016 | Story, Jr. | H04N 21/4668 |
| 10,096,033 B2* | 10/2018 | Heath | G06Q 30/02 |
| 10,269,021 B2* | 4/2019 | Levy | G06Q 30/0623 |
| 10,861,041 B2* | 12/2020 | Tietzen | G06Q 30/0236 |
| 2003/0105682 A1 | 6/2003 | Dicker et al. | |
| 2006/0195442 A1* | 8/2006 | Cone | G06Q 30/00 |
| 2007/0027760 A1* | 2/2007 | Collins | G06Q 30/02 705/14.54 |
| 2007/0027762 A1* | 2/2007 | Collins | G06Q 30/0243 705/14.58 |
| 2009/0172035 A1* | 7/2009 | Lessing | G06Q 30/02 |
| 2011/0029636 A1* | 2/2011 | Smyth | G06F 16/958 709/217 |
| 2012/0316986 A1* | 12/2012 | Levy | G06Q 30/0631 705/26.7 |
| 2012/0323674 A1 | 12/2012 | Simmons et al. | |
| 2013/0073387 A1* | 3/2013 | Heath | G06Q 30/02 705/14.53 |
| 2013/0246186 A1* | 9/2013 | Chang | G06Q 50/01 705/14.66 |
| 2013/0282430 A1* | 10/2013 | Kannan | G06Q 30/06 705/7.29 |
| 2014/0188865 A1 | 7/2014 | Karatzoglou et al. | |
| 2015/0120417 A1 | 4/2015 | Kim | |
| 2015/0220958 A1* | 8/2015 | Tietzen | G06Q 30/0226 705/14.15 |
| 2015/0262282 A1 | 9/2015 | Walti et al. | |
| 2016/0275594 A1 | 9/2016 | Mullakkara Azhuvath et al. | |
| 2017/0083522 A1 | 3/2017 | Somekh et al. | |
| 2017/0132509 A1 | 5/2017 | Li et al. | |
| 2018/0165687 A9* | 6/2018 | Levy | G06Q 30/0641 |
| 2018/0276710 A1* | 9/2018 | Tietzen | G06N 20/00 |

FOREIGN PATENT DOCUMENTS

| | | |
|---|---|---|
| KR | 10-2012-0075515 A | 7/2012 |
| KR | 10-2016-0025140 A | 3/2016 |
| WO | 2014/178536 A1 | 11/2014 |

OTHER PUBLICATIONS

International Search Report and Written Opinion for Application No. PCT/US2019/033822 dated Oct. 7, 2019.

* cited by examiner

REAL-TIME RECOMMENDATION MONITORING DASHBOARD

TECHNICAL FIELD

The present disclosure relates generally to monitoring and analyzing impressions and purchases on a website. In particular, the present disclosure relates to analyzing user activity on a website to evaluate the quality of item recommendations that are presented on the website.

BACKGROUND

Content providers for websites often use previous browsing activity of users to inform decisions about content to provide to the users in future browsing sessions. For example in a retail website context a content provider may use past viewing, clicking, adding to cart, and purchasing activity to learn about the user's interest in particular products. That information, known as clickstream or click path data, can be used to provide recommendations of new items that the user might be interested in purchasing. Information regarding content that is displayed for a user on a website, which is presumably viewed by the user, is known as "impressions."

It can be difficult to make sense of all of this clickstream data. There is not an effective way to track impressions or clicks relative to actual sales of items that are displayed on a retail website. In particular, it is difficult to conduct this comparison in real-time. Without such comparisons, it is difficult to determine whether items that are being presented as "recommended" for a user are effective for converting product views into product sales. A typical goal for retail websites is for every product view or click to lead to a purchase of that product.

Further complicating this analysis is the fact that unknown users are difficult to cater to with personalized item recommendations. Thus, recommended items that are presented to unknown users of a website detract from the accuracy of overall impression and sales statistics because there are many false positive or negatives that result from providing item recommendations to an unknown entity. Trends that could otherwise be discovered from overserving the behavior of known users as they interact with item recommendations are obscured by the data from unknown users.

Existing solutions present impression, clickstream, and sales data in separate views, making it difficult to analyze and compare impressions or clicks with sales for particular items. User interfaces for viewing and analyzing clickstream data that currently exist make it difficult to easily and automatically see the top items that are represented on the website.

SUMMARY

In summary, the present disclosure relates to methods and systems for monitoring customer impressions, clicks, and purchases on a website. Clickstream data is processed and visualized on a dashboard displayed on an administrative user interface. Administrative users of the dashboard can view different parameters of the clickstream data to gain insights into customer behaviors in real time. Two or more parameters can be overlaid one another in the visualization. In some embodiments, the dashboard can be used to evaluate the quality of item recommendations that are presented to users of the website. Various aspects are described in this disclosure, which include, but are not limited to the following aspects.

In one aspect, a system for evaluating item recommendations on a website includes an enterprise web server. The enterprise web server generates and maintains a website accessible by a plurality of users and includes a website server, a click analysis application, an item recommendation generator, and a recommendation monitoring engine. The website server is configured to generate a user interface presentable to the plurality of users on the web site which includes an item recommendation region for presenting items based on recommendations customized to each user visiting the web site. The click analysis application analyzes clickstream data received from users to determine item preferences for at least some of the users. The item recommendation generator is configured to generate item recommendations in response to requests from individual users for display of the user interface including the item recommendation region. These recommendations are based, at least in part, on item preferences of the individual user. The recommendation monitoring engine generates a recommendation management user interface that is presented to an administrator user different from the plurality of users. The recommendation management user interface includes a graphical chart display area and a plurality of analysis parameter selectors. The graphical chart display area depicts a first set of numerical values for impressions, clicks, or sales for each of a plurality of items in the item recommendation region over a selectable period of time.

In another aspect, a computer implemented method of monitoring and evaluating item recommendations presented on a retail web site is provided. A user interface is generated and presented to a plurality of retail users which includes an item recommendation region presenting one or more items based on recommendations customized to each individual retail user visiting the web site. Clickstream data received from the retail users is analyzed to determine item preferences for at least a subset of the retail users. A recommendation monitoring engine records item recommendations that are presented in the item recommendation region. A click analysis application of an enterprise web server receives clickstream data recorded from users on the web site and analyzes the clickstream data as it pertains to particular items. The clickstream data is displayed on a recommendation management user interface in a customizable, real-time dashboard. The dashboard is updated in real-time in response to further impressions, clicks, or purchases.

In yet another aspect, a computer-implemented method for displaying impression, clickstream, and sales data for a plurality of items presented in an item recommendation region of a web site is provided. A dashboard is displayed on a recommendation management user interface. The dashboard includes a plurality of data analysis parameter selectors, a plurality of time period selectors, an overlay selector, and a graphical chart display area. Selections of data analysis parameter selectors and a time period selector are received from an administrator user. A subset of the plurality of items are selected. In some aspects, the plurality of items presented in the recommendation management user interface include items identified as being most frequently presented to users within the selected one or more users. A first visual representation of impression, clickstream, or sales data corresponding to the selected data analysis parameters, time period, and subset of items is displayed within the graphical chart display area of the dashboard. The graphical chart display area is dynamically updated in response to new impression, clickstream, and sales data as it is received.

In another aspect, a computing device includes a display screen and is configured to display a recommendation management user interface on the screen. The recommendation management user interface includes a dashboard having a plurality of data analysis parameter selectors, a time period selector, a data overlay selector, and a graphical chart display area. The data analysis parameter selectors include a time selector, an impression selector, a click selector, a purchase selector, and a user selector. The graphical chart display area is configured to display a first visual representation of one or more of impression, clickstream, and sales data corresponding to selected data analysis parameters and time period. The impression, clickstream, and sales data corresponds to item displayed to a retail user in an item recommendation region of a retail web site. The graphical chart display area can optionally display a second visual representation of data corresponding to the items that differs from the selected data analysis parameters and is displayed over the first visual representation.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
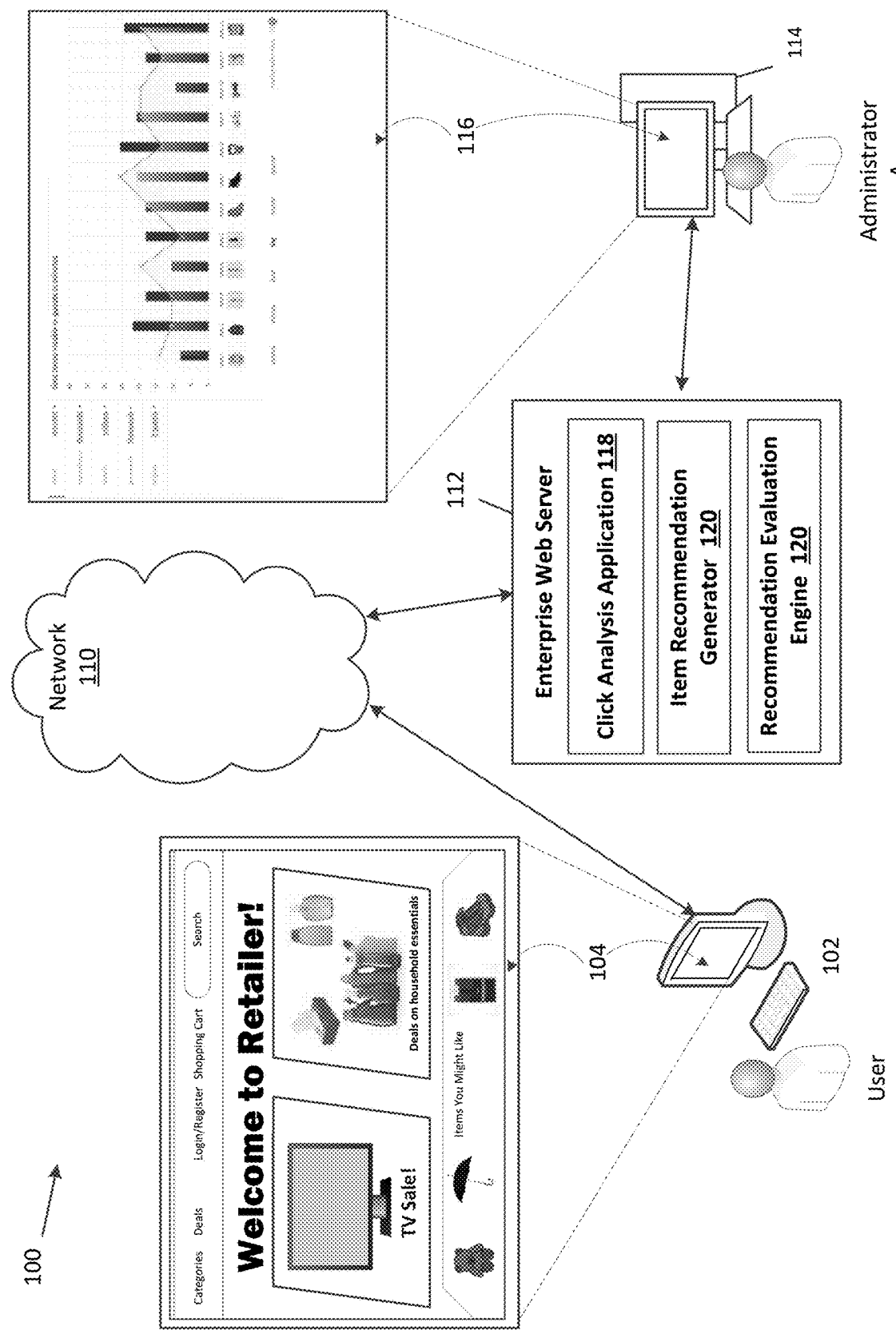
FIG. 1 illustrates a diagram of an example network and system for presenting and evaluating item recommendations on a website.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Many retail websites try to encourage additional purchases by presenting product recommendations to customers. Customers are often overwhelmed by the selection when retail websites offer a multitude of items. It can be time consuming and inefficient to search for items if the customer does not know of a specific item that they are looking for. If there is some browsing history or profile information associated with a user, websites can use that history or information to present recommendations for products that the user is more likely to be interested in purchasing. However, if there is not any browsing history associated with a user (the user is a new visitor to the website) recommendations cannot easily be personalized. This is known as the "cold start" problem.

Item recommendations can be generated for unknown users or "new visitors" to a retail website based on the user's context while visiting the web site. Co-pending application having Ser. No. 15/990,363, which is hereby incorporated by reference in its entirety, describes methods and systems for generating item or product recommendations by determining the context in which an unknown user is accessing the web site and then accessing data about items that known users in similar contexts viewed, clicked, or purchased. As the unknown user interacts with the web site, the context data combined with the unknown user's clickstream data is combined to present better item recommendations. In the context of the present disclosure, a click can correspond to any selection of an item within a retail website; in some instances, the clicks described herein represent user selections without regard to the manner of input from a user, and which are received in association with an item presented within a recommendation region of the website.

For purposes of this disclosure, a "context" generally includes information surrounding a user interaction with a website, and corresponds to any knowable information regarding that interaction. Typically, context can be obtained from website request data and/or cookie data (generally represented by captured clickstream data, generally) and includes one or more of a time, location, and type of device. Times can include: time of day, day of week, time of month, season, or an event. Locations can include: geographic location of the device from which the user is accessing the website, geographic location of the nearest retail store, whether the device is at a residential or business location, and proximity to a given event. Type of device refers to the type of device the user is using to browse the website and can include: smartphone, tablet, laptop, desktop computer, and store kiosk.

Additionally, it can be difficult to properly evaluate item recommendations that are presented to users. Just as it is difficult for customers to find products that they want to buy when a retail website offers a multitude of options, it is difficult for retailers to determine which products to recommend to users. Ideally, item recommendations are customized to each individual user and result in "conversion" or sales of those items. Analyzing conversion rates of item recommendations is a good way to evaluate the quality of item recommendations that are presented to a user of a retail web site.

The present disclosure provides systems and methods for evaluating item recommendations that are presented on a retail website. Impressions, clicks, and purchases are recorded from user interactions with items on the website. The users' activity is processed and displayed on a dashboard. Sales, click, and impression data are consolidated into a single screen to readily represent effectiveness of recommendations. Information about the quality of item recommendations is gleaned from the displays on the dashboard, allowing administrative users to make decisions regarding accuracy of item recommendations.

Referring first to FIG. 1, a diagram of an example system 100 for recommending items on a website is illustrated. In the example shown, a user computing device 102 displays an example user interface 104 which is presented to a user U. The user U interacts with the user interface 104 through inputs and outputs of the computing device 102. The user U, in some examples, is a customer browsing a retail website. The computing device 102 connects through a network 110 to an enterprise web server 112. The network 110 can be any of a variety of types of public or private communications networks, such as the Internet. The enterprise web server 112 functions to provide a website accessible through the network 110 by the one or more devices 102. In some aspects, the enterprise web server includes a plurality of communicatively interconnected computing devices. In some examples the website is a retail website that allows the users to view information about items for sale and to make purchases. In the embodiment shown, an administration computing device 114 is operated by an administrator A and communicates with the enterprise web server 112. In the embodiment shown, the enterprise web server 112 includes a click analysis application 118, an item recommendation generator 120, and an impression monitoring engine 122, which is described further in FIG. 3. The administration computing device 114 displays an administrator user interface 116, which Administrator A interacts with through input devices of the administration computing device 114. The computing devices 102, 114 can include desktop computers, laptop computers, tablet computing devices, and smartphones.

Figure 2:
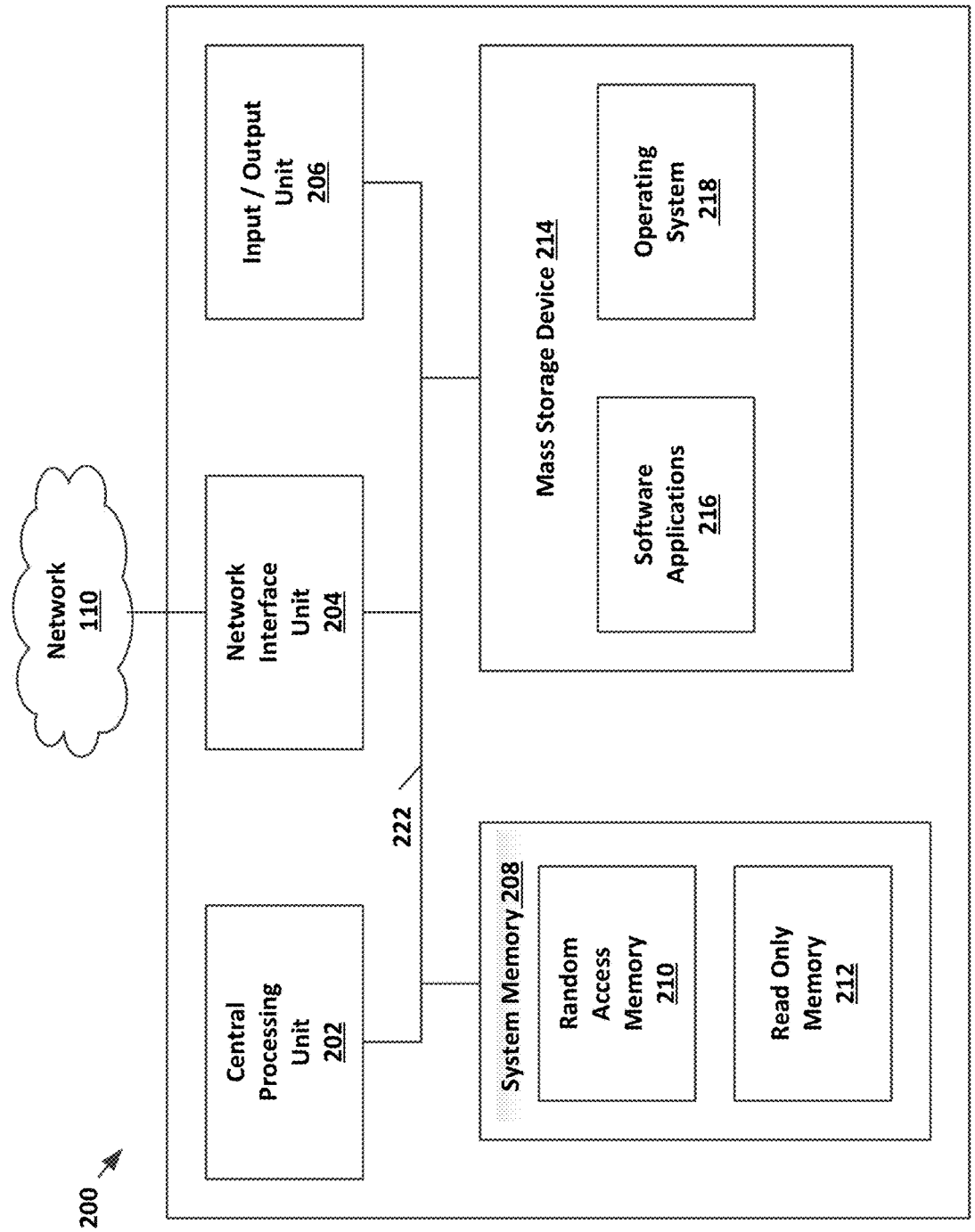
FIG. 2 illustrates an example block diagram of a computing system useable in the context of FIG. 1.

Referring now to FIG. 2, an example block diagram of a computing system 200 is shown that is useable to implement aspects of the system 100 of FIG. 1. The computing system 200 can be used to implement, for example, the computing systems 102 or 114 of FIG. 1, in example aspects.

In the embodiment shown, the computing system 200 includes at least one central processing unit ("CPU") 202, a system memory 208, and a system bus 222 that couples the system memory 208 to the CPU 202. The system memory 208 includes a random access memory ("RAM") 210 and a read-only memory ("ROM") 212. A basic input/output system that contains the basic routines that help to transfer information between elements within the computing system 114, such as during startup, is stored in the ROM 212. The computing system 200 further includes a mass storage device 214. The mass storage device 214 is able to store software instructions and data.

The mass storage device 214 is connected to the CPU 202 through a mass storage controller (not shown) connected to the system bus 222. The mass storage device 214 and its associated computer-readable storage media provide non-volatile, non-transitory data storage for the computing system 200. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 202 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 200.

According to various embodiments of the invention, the computing system 200 may operate in a networked environment using logical connections to remote network devices through a network 110, such as a wireless network, the Internet, or another type of network. The computing system 200 may connect to the network 110 through a network interface unit 204 connected to the system bus 222. It should be appreciated that the network interface unit 204 may also be utilized to connect to other types of networks and remote computing systems. The computing system 200 also includes an input/output controller 206 for receiving and processing input from a number of other devices, including a touch user interface display screen, or another type of input device. Similarly, the input/output unit 206 may provide output to a touch user interface display screen or other type of output device.

As mentioned briefly above, the mass storage device 214 and the RAM 210 of the computing system 200 can store software instructions and data. The software instructions include an operating system 218 suitable for controlling the operation of the computing system 200. The mass storage device 214 and/or the RAM 210 also store software applications 216, that when executed by the CPU 202, cause the computing system 200 to provide the functionality of the computing systems 102, 114 discussed in this document.

Figure 3:
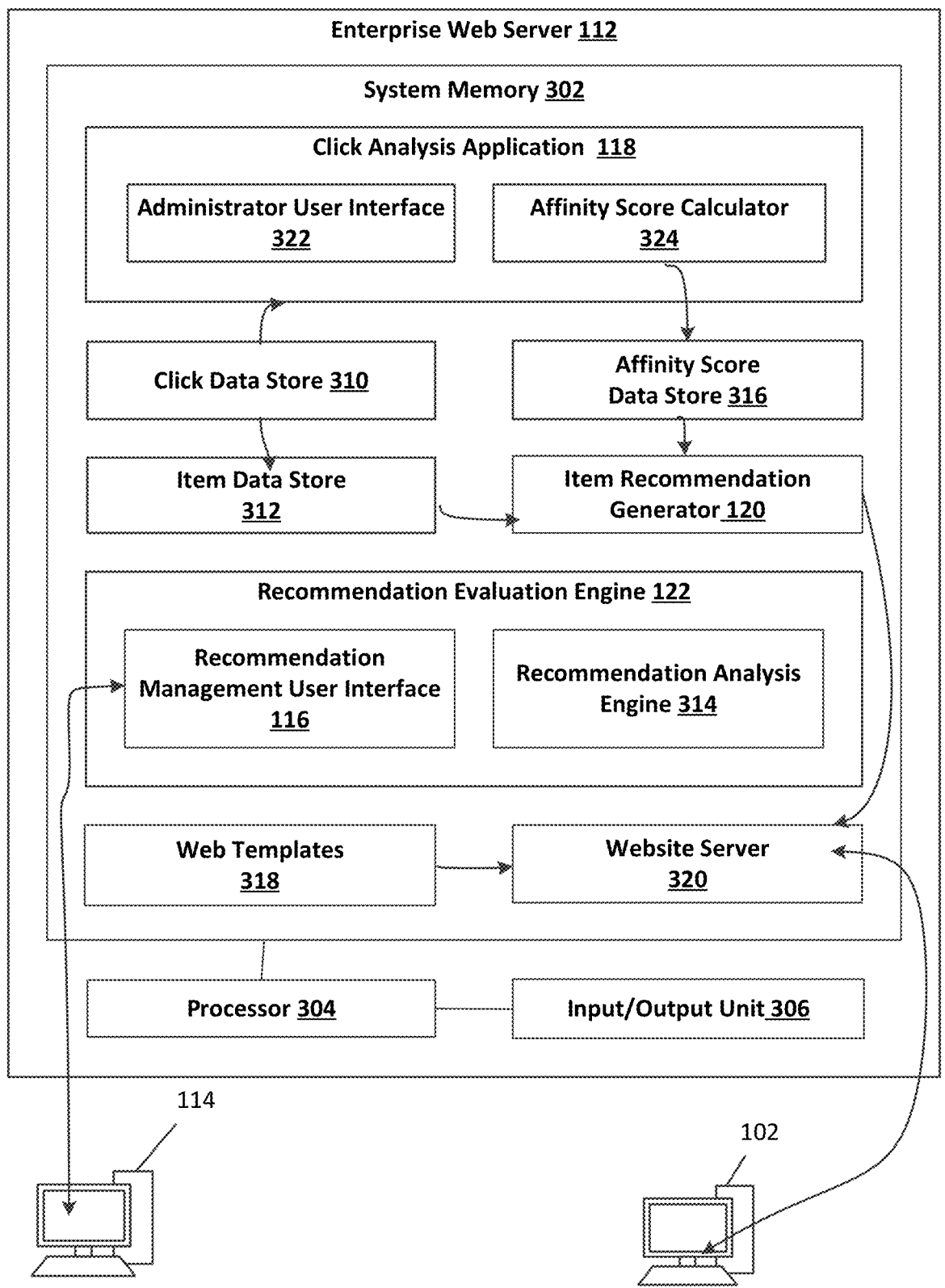
FIG. 3 illustrates an example block diagram of the enterprise web server of FIG. 1.

FIG. 3 illustrates a more detailed schematic diagram of the enterprise web server 112 of FIG. 1. In the embodiment shown, the enterprise web server 112 includes a system memory 302, operatively connected to a processor 304 and an input/output unit 306.

In the example embodiment shown, the system memory 302 includes a click analysis application 118, an item recommendation generator 120, a recommendation evaluation engine 122, a click data store 310, an item data store 312, an affinity score data store 316, web templates 318, and a website server 320. The software modules are implemented as discussed below.

The click analysis application 118 operates to analyze clickstream data received from known or identified users accessing the web site operated by the enterprise web server 112. The click analysis application 118 generates affinity scores for items based on user context.

The click analysis application 118 of FIG. 3 includes an administrator user interface 322 and an affinity score calculator 324. The administrator user interface 322 is configured to communicate with one or more administrator computing devices 114. The user interface 322 can be utilized by an administrator user to adjust parameters of the click analysis application 118. In particular, the administrator user can adjust algorithms and methods utilized by the affinity score calculator 324 in order to optimize the item recommendations that are ultimately generated from the affinity scores.

In one embodiment the click analysis application 118 analyzes clickstream data from known users to identify context information about the browsing activity associated with the clicks. Context information can include time, date, geographic location, and type of device.

The affinity score calculator 324 utilizes matrix factorization and k-means clustering to calculate affinity scores. A score is calculated for each combination of item and context possible for the website based on the known user clickstream data. Scores are predicted for combinations of items and contexts where there is not clickstream data to support the combination. Bayesian methods are used to avoid overfitting the data. Once the affinity score calculator 324 calculates scores for every pair of item and user context, the scores are output to the affinity score data store 316.

The item recommendation generator 120 operates to identify items to recommend to users of the website. In the case of known or identified users, the item recommendation generator 120 uses past browsing activity to inform decisions about which items to recommend to the known users. Past clickstream activity of each identified user is utilized to present new item recommendations. In some embodiments, at least a subset of the plurality of users are known to the enterprise web server and there is item preference data for those users.

In the case of unknown or unidentified users, the item recommendation generator 120 relies on information generated by the click analysis application 118. In some embodiments, at least a subset of the plurality of users are unknown for the enterprise web server and there is no item preference data for those users. The click analysis application 118 operates to analyze clickstream data of known users and draw conclusions about which items or types of items are most popular with users based on the particular context in which the user is accessing the website.

The click data store 310 stores clickstream data received from known users of the website. The click data store 310 is accessed by the click analysis application 118. Clickstream data includes page requests that are made on a website by a user. Each page request generates a signal representing human clicks. Tracking cookies are used to record click path data. Cookies are text files placed on a user's computer to track the user's activity while browsing a website. The click data store 310 is accessed by both the click analysis application 118 and the item recommendation generator 120.

The item data store 312 stores information about items that are available to present or display on the website. The information can include attributes of items such as size, price, color, etc. The item data store 312 can also store images or videos of available items. In examples where the website is a retail website, the items are products that are available for sale through the website. The item data is accessed by the item recommendation generator 120 and the website server 320.

The affinity score data store 316 operates to store scores that are generated by the affinity score calculator 324 of the click analysis application 118 for each combination of item and context at which known users have clicked or interacted with an item. Predicted scores are stored for item/context combinations that were not found in the known user clickstream data. The item is accessed by the item recommendation generator 120 when an unknown or unidentified user accesses the website. The score stored in the affinity score data store 316 informs decisions made by the item recommendation generator 120 for presenting items or products to a new user of the website.

The web templates 318 store templates that are accessed by the website server 324 when presenting a user interface to a user or customer on the website. Web templates provide a visual outline for a website that can be modified with detailed information. Web templates may include an item recommendation region designated for presenting item or product recommendations.

The website server 320 operates to generate and present to a plurality of users a user interface for accessing information associated with the website. The website includes on at least a portion of its pages, an item recommendation region.

The recommendation evaluation engine 122 includes an administrator user interface 116 and a recommendation analysis engine 314. The recommendation evaluation engine 122 operates to receive and analyze clickstream data from the website. A clickstream is a recording of parts of the screen a user clicks on a web site. Each click action is logged for analysis. For purposes of this application, clickstream data of interest includes viewing an item (impression), clicking an item to view more information, adding an item to favorite list or shopping cart, and purchasing an item. As used in this application, the term "impressions" refers to instances when a particular item is displayed on a website. Impressions can be recorded in number of times an item appears on a website or in time that an item is displayed on the website. One measures how often a particular item is displayed on a website while the other measure how long a user presumably views an item. Generally, it is assumed that the item is viewed by a user if it is displayed on the website. Impressions are recorded to determine if any actions are taken with the item after the item is viewed. Purchases are recorded as part of clickstream data. The system records purchases of items that are presented in the recommendation region of the website.

The recommendation management user interface 116 operates to present a graphic user interface to an administrator user A on an administrator computing device 114. The administrator user interacts with the recommendation management user interface 116 to select different views of impression, click, and sales data that are gathered at the enterprise web server 112. The recommendation management user interface 116 is further described with respect to FIGS. 10A-14B.

The recommendation analysis engine 314 operates to analyze clickstream and impression data to assess the quality of recommendations that are presented in an item recommendation region of a retail website. The recommendation analysis engine 314 accesses clickstream data from the click data store 310 and analyzes impressions, clicks, and sales, of items that are presented on the retail website. The recommendation analysis engine 314 operates to process the data to organize the impressions, clicks, and sales by user, location, and time. In some embodiments, the recommendation analysis engine 314 analyzes the data to determine a spatial context in which an item was displayed or a user context of a user viewing the website. User context info can include location, time, and device type. This processed data is then sent to the recommendation management user interface 116 for presentation on a dashboard.

Figure 4:
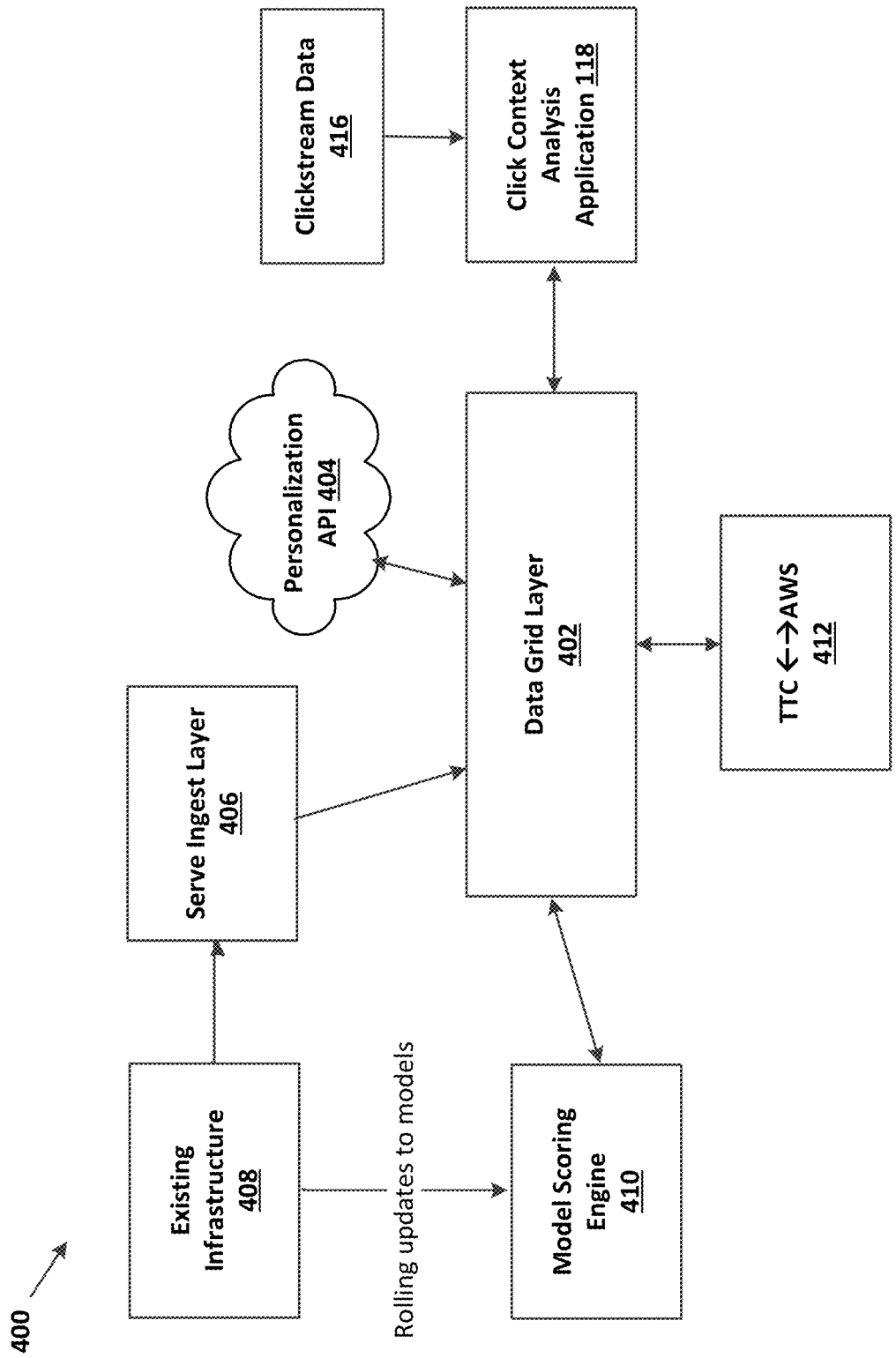
FIG. 4 illustrates an example block diagram of a system useable to generate and assess effectiveness of item recommendations.

Referring now to FIG. 4, a block diagram illustrating an example particular implementation of a system 400 useable to generate and assess effectiveness of item recommendations as described herein is provided. In particular, the system 400 is useable to process website activity, such as clickstream activity, and process that information in near-realtime.

The data grid layer 402 receives impression and sales information, and provides a compute space for calculating user and item matrices, as further discussed below. The personalization API 404 provides an interface to view personalization information, for example via a management user interface. The serve ingest layer 406 stages data received from existing infrastructure 408, which includes existing web services infrastructure for both web and mobile user interfaces. The model scoring engine 410 will receive models from the data grid layer 402, and will receive rolling updates from existing infrastructure to allow for assessment of the models built using the data grid layer 402. In some embodiments, the model scoring engine 410 can initiate a periodic refresh of models via the data grid layer; in other embodiments, the data grid lay 402 automatically updates models at a predetermined periodicity, to be provided to the model scoring engine. The model scoring engine 410 can also receive rolling updates to models from the existing infrastructure 408, for example to determine an appropriate time at which to update a specific model (e.g., in the instance a model becomes less effective in generating accurate item recommendations).

Clickstream data 416 is received at the click analysis application 418 for processing. The clickstream data 416 may be communicated to the data grid layer 402, where it can be accessed and utilized by other applications. The click analysis application 418 operates to analyze the clickstream data 416 for at least the purpose of providing item recommendations on a website. In some aspects, the click analysis application 418 can process the clickstream data 416 in order to generate reports, compare clicks with purchases, etc. The click analysis application 418 may operate in the same manner as the click analysis application 118 of FIGS. 1 and 3.

Figure 5:
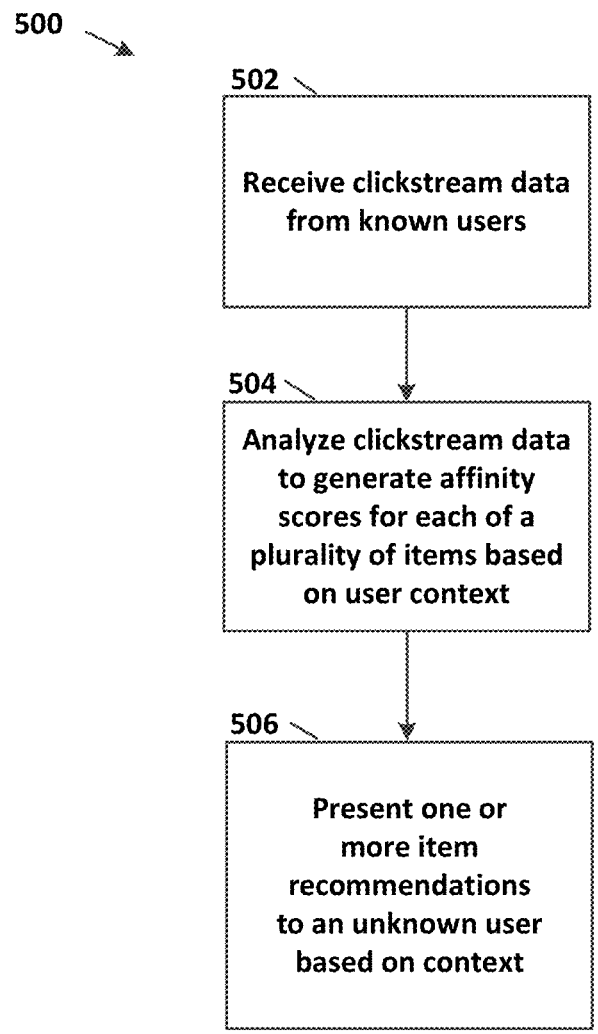
FIG. 5 illustrates an example method of generating item recommendations to unknown users.

FIG. 5 illustrates an example method 500 of generating item recommendations to unknown users based on context. The method 500 provides an overview of how a web server, such as the enterprise web server 112 of FIG. 1, can be utilized to present personalized recommendations to users of a website, even if the users are unknown.

At operation 502, clickstream data is received from known users. In some embodiments, clickstream data is received at a click analysis application such as the click analysis application 118 of FIG. 3. In some embodiments, clickstream data is immediately stored in a data store such as the click data store 310 of FIG. 3. The clickstream data includes page views, purchases, and other interactions that a known user has made with a web site. Clickstream data of interest pertains to particular items that are presented on the website. The clickstream data also includes information about the time, place, and device at which the clicks occurred.

At operation 504, the clickstream data is analyzed in order to generate scores for each of a plurality of items based on user affinity. In some embodiments, the click analysis application 118 performs this analysis using matrix factorization along with k-means clustering on a user vector based on context. The clickstream data analysis process is further described with respect to FIG. 6.

At operation 506, one or more item recommendations are presented to an unknown user based on the unknown user's context. An item recommendation generator, such as the item recommendation generator 120 of FIG. 3 utilizes affinity scores to predict which items an unknown user will be most likely to purchase. Items are selected from context-based clusters of items based on which, on average, have the best conversion rates of views to sales. The recommendation presenting process is further described with respect to FIGS. 7-8.

Figure 6:
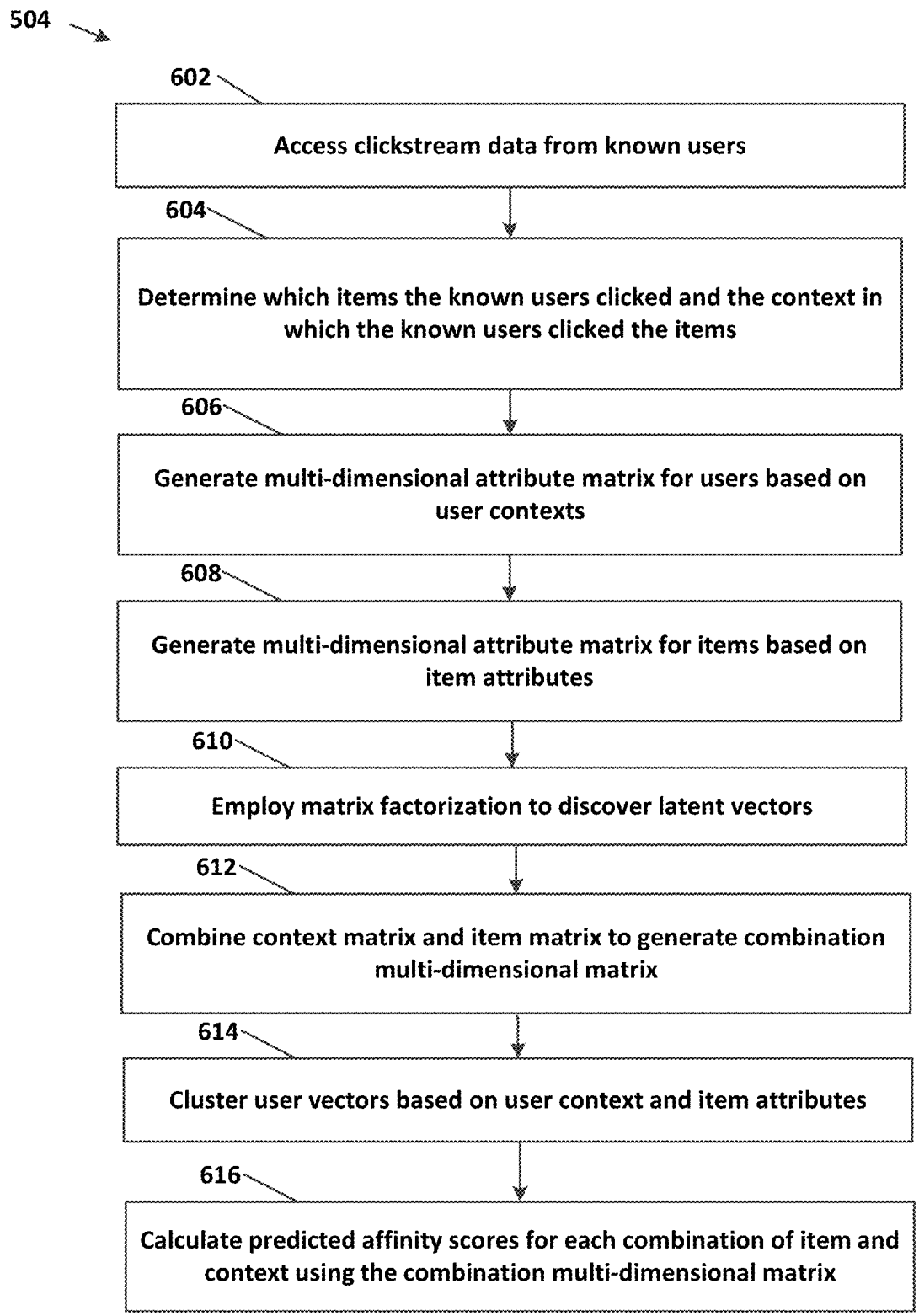
FIG. 6 illustrates an example method of analyzing clickstream data from known users to generate predicted affinity scores for item-context combinations.

FIG. 6 illustrates an example method 504 of analyzing clickstream data of known users to calculate affinity scores for items based on user context. In some embodiments, the method 504 is performed by an application such as the click analysis application 118 operating as part of the enterprise web server 112 of FIG. 3.

At operation 602, clickstream data from known users is accessed. In some aspects, the clickstream data is accessed from a click data store 310 by a click context analysis application 118. In other embodiments, the clickstream data may be received continuously or in batches as it is generated by known users.

At operation 604, the click analysis application 118 determines which items the known users clicked. The click represents interaction with an item such as viewing, saving, adding to a shopping cart or bag, and purchasing. The click analysis application 118 also determines a context in which the user clicks occurred. The context includes one or more of a time, place, and type of device at which the website was accessed.

At operation 606, a multi-dimensional attribute matrix is generated by the click analysis application 118. The matrix is generated for users based on user contexts. At operation 608, a similar multi-dimensional attribute matrix is generated for items based on item attributes.

At operation 610, matrix factorization is employed to discover latent vectors for context. Latent vectors are values or information for a user that is not directly received from the user, but instead is indirectly observed. In this instance, the latent vectors are the context of the users as they are interacting with various items on a website. Latent vectors are also discovered for the items based on their attributes. The vectors are utilized to calculate affinity scores.

At operation 612, the context matrix from operation 606 and the item matrix from operation 608 are combined into a combination multi-dimensional matrix. The combination multi-dimensional matrix includes values representing interactions that have occurred between users and items on the website.

At operation 614, the user vectors are clustered on common attributes of the user context at which clicks occurred. K-means clustering is utilized to group common vectors together.

At operation 616, predicted affinity scores are calculated for each combination of item and context using the combination multi-dimensional matrix. In some embodiments, the affinity scores are calculated using the following equation:

$$\min_{q^*,p^*} \sum_{(u,i)\in \kappa} (r_{ui} - q_i^T p_u)^2 + \lambda(\|q_i\|^2 + \|p_u\|^2)$$

In this equation, u is a user matrix, $p_u$ is a user vector for a particular user "u." $q_i$ is an item vector and $r_{ui}$ is the affinity score. K is the set of the (u,i) pairs for which $r_{ui}$ is known (based on the clickstream data of known users). Bayesian methods are applied to avoid overfitting the data. The affinity scores may be stored in a data store such as the affinity score data store 316, for later use.

Figure 7:
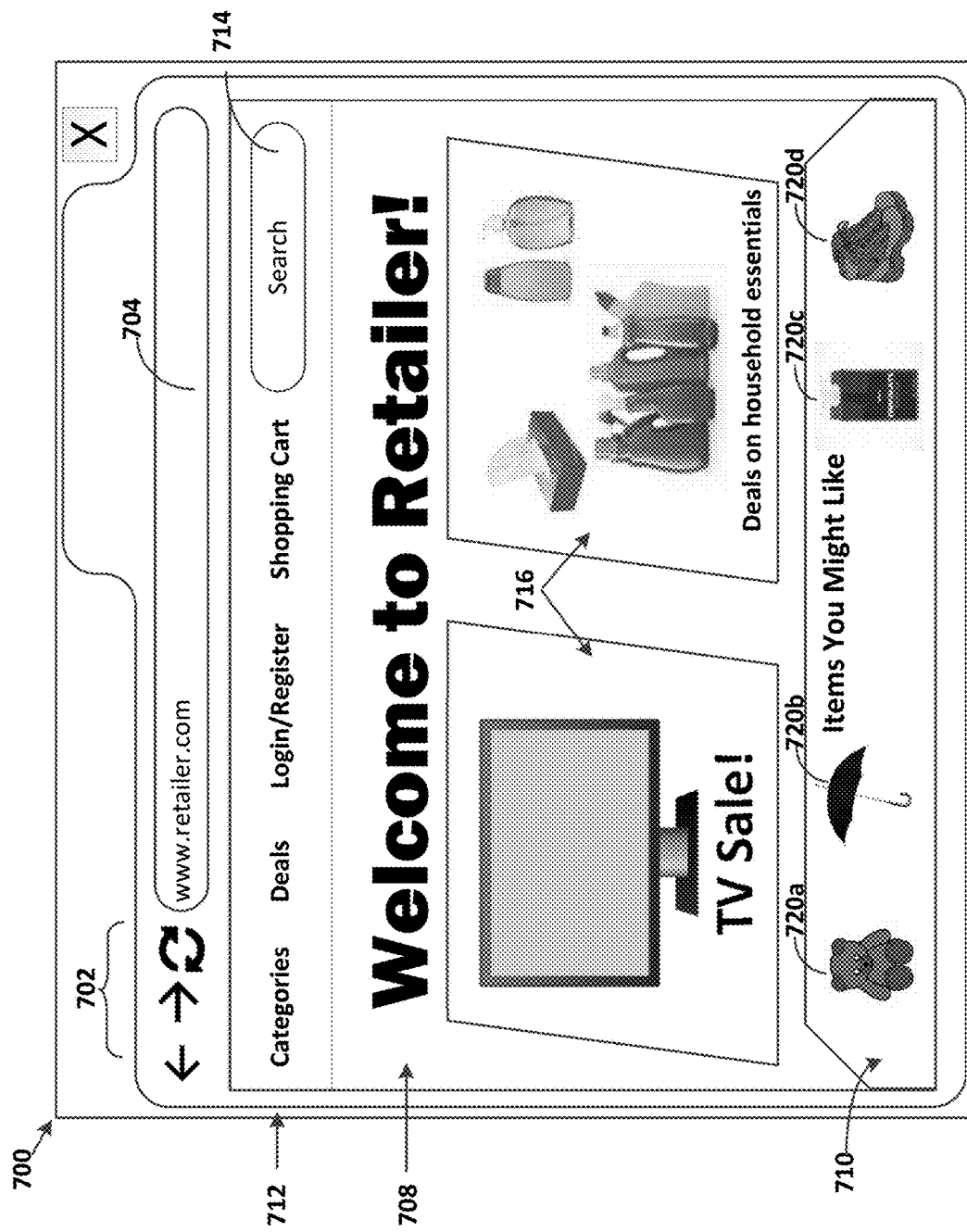
FIG. 7 illustrates an example embodiment of a website presenting item recommendations to a user.

FIG. 7 illustrates an example web browser 700 displaying the landing page of a retail website 708. The web browser 700 is shown with navigation buttons 702 and an address bar 704. Here the address bar indicates that the website displayed is www.retailer.com. The website 708 displays graphical links 716 to sales and categories of items. An item recommendation region 710 is displayed including "Items You Might Like." A series of items 720*a*, 720*b*, 720*c*, 720*d* are displayed as recommended items for the user. In this example, the user of the website is an unknown or unidentified visitor to the website. Items displayed as being recommended to the unknown user are determined by the process described in FIG. 8.

In some embodiments, clickstream data is received from an unknown user of a website as the unknown user begins to interact with content on the website. This clickstream data is used to further refine item or product recommendations that are presented to the user. In some embodiments, the same item recommendations will be presented multiple times as the user navigates through pages of the website. The item recommendations may switch to the next highest scoring items if the top highest scoring items that were initially presented are not clicked on by the unknown user. As the unknown user interacts with the website, the system "learns" more about the user and can provide more relevant item recommendations. This creates a feedback loop where the item recommendation generator 112 continually improves the item recommendations for the user as more information is gathered about the user.

Figure 8:
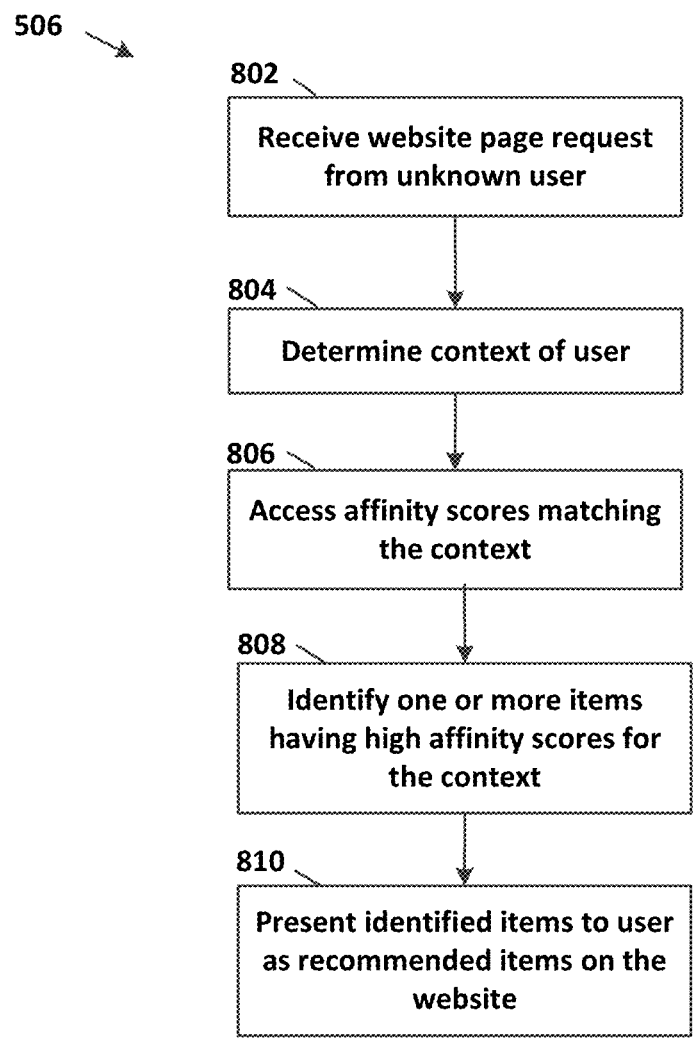
FIG. 8 illustrates an example method of presenting item recommendations to an unknown user based on context.

FIG. 8 illustrates an example method 506 of identifying and presenting item recommendations for an unknown user. In some embodiments, this method 506 performed by the item recommendation generator 120 of FIG. 1.

At operation 802, the enterprise web server 112 receives a website page request from an unknown user. An unknown user is a user for which the enterprise web server lack prior identifiable user information. The website server 320 receives the page request for the unknown user and communicates that page request to the item recommendation generator 120 in order to generate item recommendations to fill the item recommendation region of a web template.

At operation 804, the context of the unknown user is determined. Information about the time, location, and type of device the unknown user is accessing the website from is received at the website server 320 and is communicated to the item recommendation generator 120.

At operation 806, the item recommendation generator 120 matches the unknown user's context to affinity scores in the affinity score data store 316. The match is made based on a context cluster of items. The affinity scores matching the context are accessed and analyzed.

At operation 808, the item recommendation generator 120 utilizes the affinity scores to identify one or more items in the item data store 312 to recommend to the unknown user. The affinity scores represent the likelihood that a user in a particular context will be interested in purchasing a particular item based on its attributes. The items selected are preferably those that, on average, have the highest conversion rates within the context cluster.

At operation 810, the item recommendation generator 120 communicates the identified items to the website server 320. The website server 120 utilizes web templates 318 to generate a user interface for interacting with the website. A portion of a web template includes an area where item recommendations can be presented. The website server 320 inserts the identified items into the item recommendation region of the web template. The recommended items are then presented for the unknown user to view.

Figure 9:
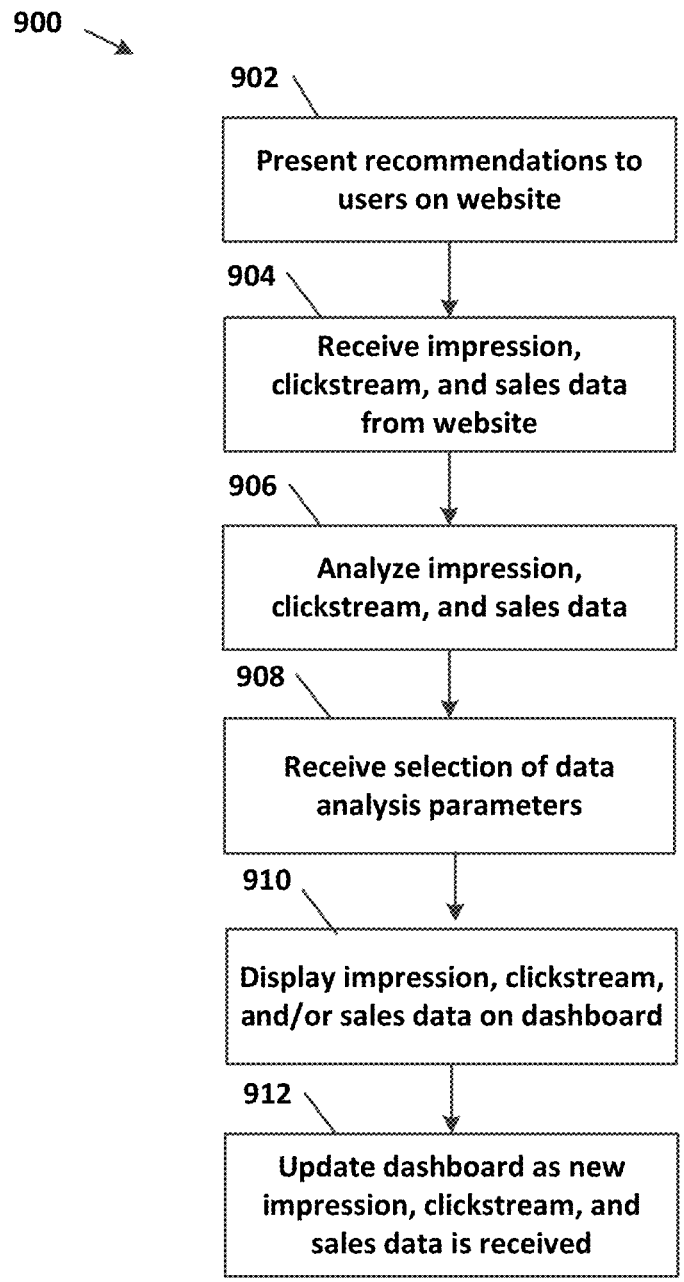
FIG. 9 illustrates an example method of evaluating item recommendations.

FIG. 9 illustrates an example method 900 of evaluating item recommendations that are presented on a website. The method 900 may be performed by an enterprise web server, such as the enterprise web server 112 of FIGS. 1 and 3. The item recommendations may be presented in an item recommendation region on a user interface of a website that is viewed by users on a user interface 104 of a user computing device 102 like that shown in FIG. 1.

At operation 902, item recommendations are presented to users of a website on a user interface. In some embodiments, the item recommendations are displayed within an item recommendation region of the website. The item recommendations are generated by the item recommendation generator 310 of the enterprise web server 112. In some embodiments, the click analysis application 118 operates to provide information to the item recommendation generator 310 if the user viewing the website is an unknown user or new visitor to the website.

At operation 904, impression, clickstream, and sales data are received from the website server. This data is recorded and stored in the click data store 310. The impression, clickstream, and sales data are coordinated and processed by the recommendation analysis engine 314.

At operation 906, the impression, clickstream, and sales data is analyzed. In some embodiments, this analysis is performed by the recommendation analysis engine 314 of FIG. 3. Impressions for items presented within an item recommendation area of the website are processed to determine if the impressions led to further interactions with the items. These interactions are recorded as clicks in the clickstream data. The clickstream data is analyzed to determine if any interactions with the recommended items led to purchases of those items. These purchases are reflected in the sales data for those items. The impression, clickstream, and sales data are processed to organize the data by item and time period. In some instances, the data can also be organized by location or user.

At operation 908, selection of data analysis parameters are received. In some embodiments, an administrator user A selects one or more analysis parameter selectors displayed on the recommendation management user interface 116. The administrator user A also selects a time selector and optionally an overlay selector displayed on the recommendation management user interface 116. Selection of analysis parameters and a time frame defines the clickstream data that will be visualized on a dashboard of the recommendation management user interface 116.

The data analysis parameter selector can select user based on location. The data analysis parameter selector can select one or more individual users of the web site. In some cases, at least one of the data analysis parameter selectors selects impressions based on total time an item is displayed in the item recommendation region within the selected time period. In some aspects, at least one of the data analysis parameter selectors selects impressions based on a number of times an item is displayed in the item recommendation region for the selected time period. In some embodiments, at least one of the data analysis parameter selectors selects clicks based on a number of times an item is clicked by a user within the selected time period. In some cases, at least one of the data analysis parameter selectors selects clicks based on a number of time an item is purchased by a user within the selected time period. Further details regarding the recommendation management user interface 116 and selectors are provided with respect to FIGS. 10A-14B.

In some embodiments, the administrator user A may select a subset of items to analyze. In some aspects, the item included in the plurality of items includes at least one user-selectable item. Such subsets may be based on items categories, location, or other criteria. In other embodiments, the items may be selected automatically based on criteria such as most views/impressions, most clicks, or most purchases. In some instances, the subset of the plurality of items are automatically selected based on items that were displayed the most times in the item recommendation region for the selected time period. Regardless of the method of selection, the items displayed on the dashboard are selected from items that could be presented within an item recommendation region of the retail website.

At operation 910, data selected by the user is displayed on a graphical chart display area of the dashboard. The data is visualized in the form of a graph such as a line graph, a scatter plot, histogram, or a bar graph. Upon selection of the overlay selector, a second data visualization is laid over the graph, using a different graph type. Further description of the recommendation management user interface 116 and data visualization are provided with respect to FIGS. 10A-14B.

At operation 912, the dashboard is updated in real-time. As additional impression, clickstream, and sales data comes in through the enterprise web server 112, the dashboard is dynamically updated by the recommendation monitoring engine. In some embodiments, the dashboard is continually updated in response to new data in real-time or at least near-realtime. In other embodiments, the new data is received in batches and the dashboard is updated at regular intervals, in near real-time.

FIGS. 10A-14B illustrate different views of a dashboard 1000 displayed on a recommendation management user interface. The recommendation management user interface may be the recommendation management user interface 116 generated by the recommendation monitoring engine 310 for display on the administrator computing device 114 of FIG. 3. The dashboard 1000 includes a graphical chart display area 1002 that is controlled with one or more data analysis parameter selectors 1004 and time selectors 1006. By modifying the data analysis parameter selectors 1004 and time selectors 1006, an administrator user A can change the data that is visualized within the chart display area 1002. The graphical chart display area 1002 is updated in response to user selection of at least one of the plurality of analysis parameter selectors. In some embodiments, the dashboard 1000 further includes a toggle 1008 that turns on and off display of additional data in an overlay view.

Figure 10A:
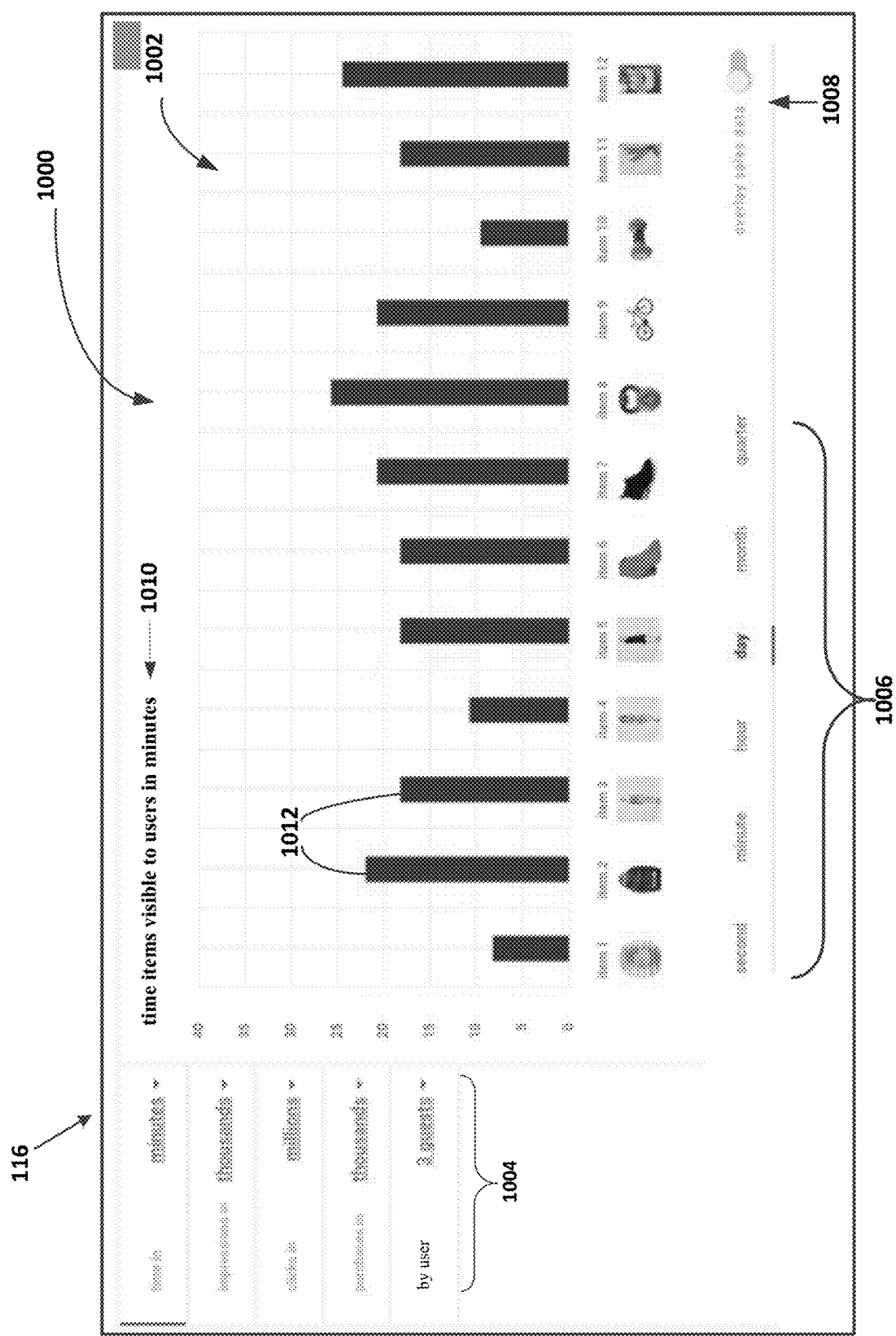
FIG. 10A illustrates an example user interface displaying a dashboard for evaluating item recommendations.

In FIG. 10A, the graphical chart display area 1002 illustrates data relating to items 1-12. The analysis parameter selector 1004 for "time in minutes" has been selected and the time selector 1006 for "day" has been selected. The chart display area 1002 shows how many minutes each item was visible to users for the day. The title 1010 indicates that the dashboard is displaying "time items visible to users in minutes." In the example of FIG. 10A, the graphical chart display area 1002 visualizes the impression data in the form of a bar graph. Each bar 1012 represents the total time that each item was visible to users in a day. Other visualizations of the data are possible such as scatter plots, line graphs, histograms, area graphs, and combinations thereof.

Figure 10B:
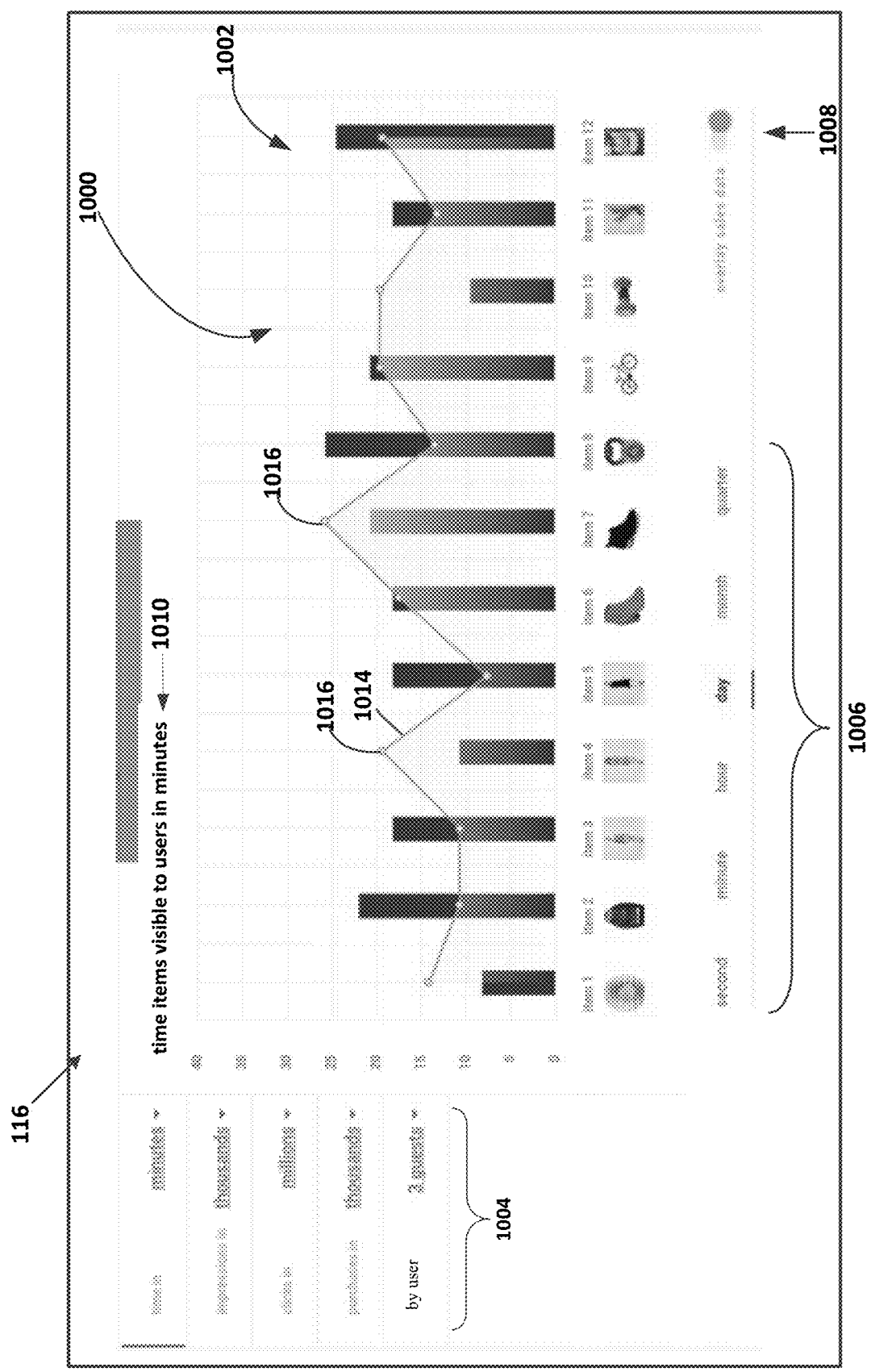
FIG. 10B illustrates another view of the example user interface of FIG. 10A.

FIG. 10B displays another view of the dashboard 1000 of FIG. 10A. In the view of FIG. 10B, the "overlay sales data" toggle 1008 has been turned on. A line graph 1014 is displayed overlaying the bar graph for time items were visible. The line graph 1014 represents the sales for each item on that day. Each point 1016 on the line graph 1014 illustrates the value for the sales. The overlay of sales data over the impression data allows for a direct visual comparison between impression time and sales. An administrator user can quickly see whether there is a good relationship between time that items are visible and purchases that are made for each item. In the example of FIG. 10B, an administrator user may determine that item 4 has good conversion rates and should be recommended more often to users of the retailer website. Conversely, an administrator user may determine that item 8 has poor conversion rates and should be recommended less frequently. Conversion refers to item views or clicks that lead to sales.

Figure 11A:
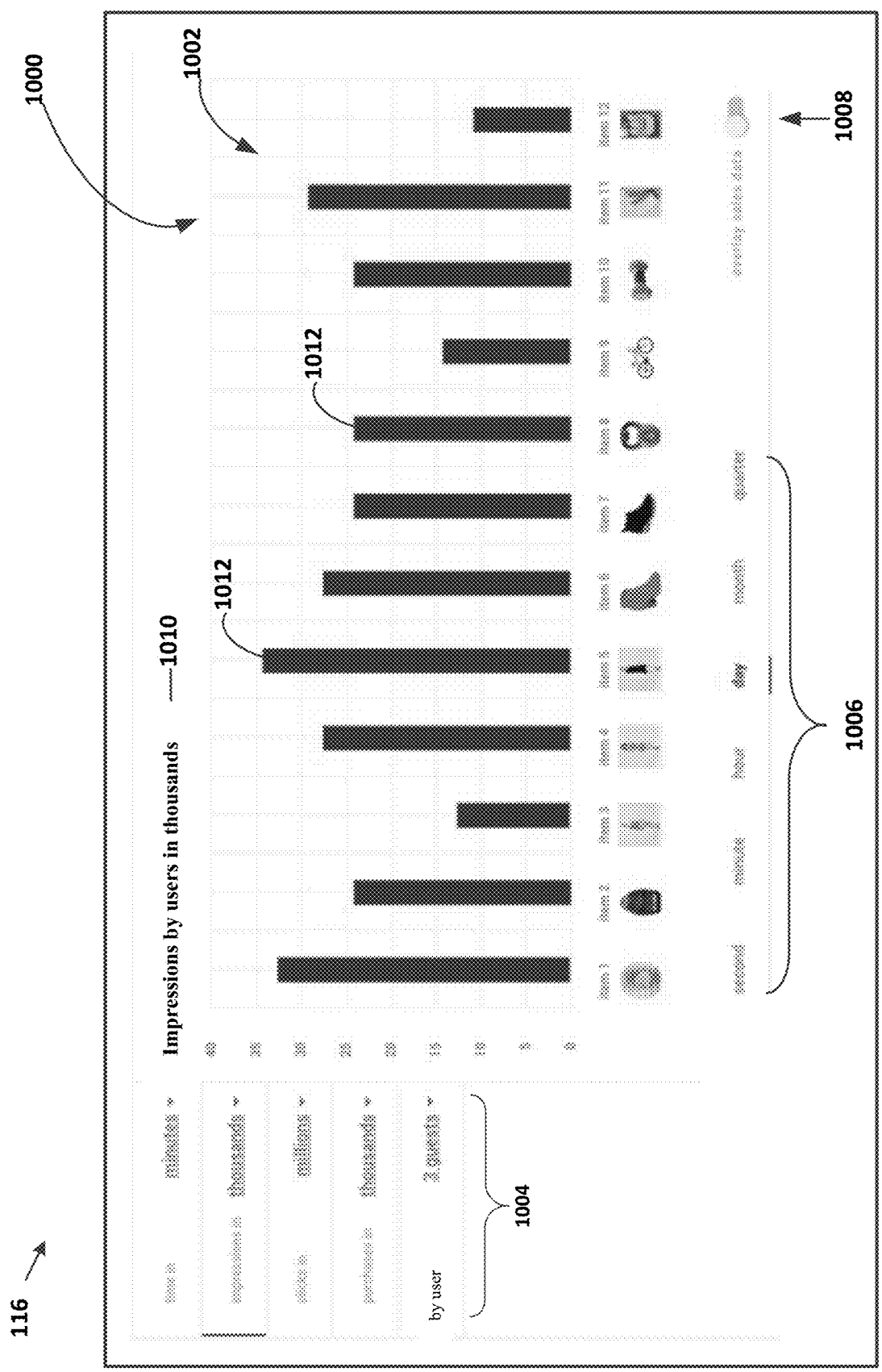
FIG. 11A illustrates another view of the example user interface of FIG. 10A.
Figure 11B:
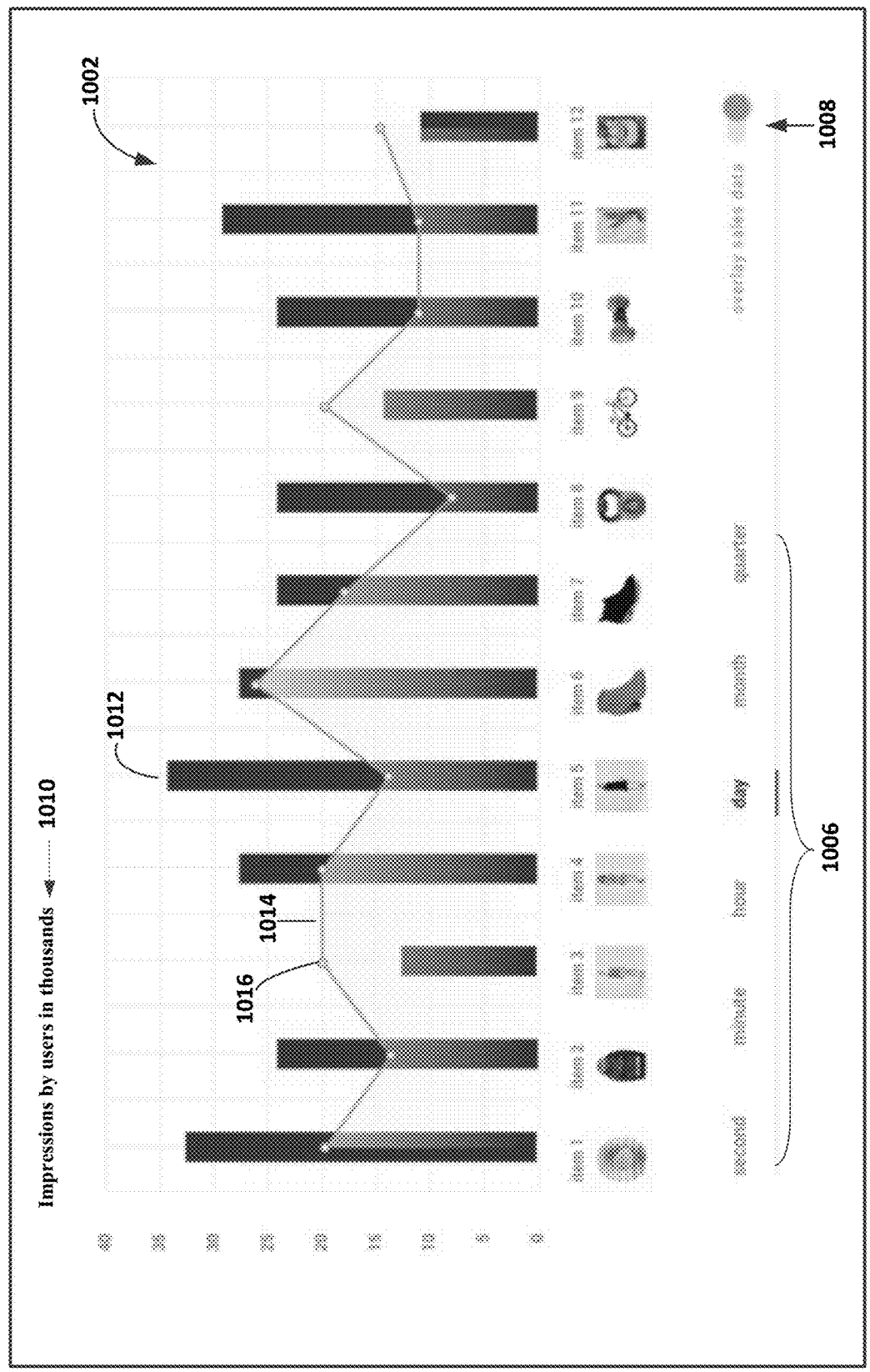
FIG. 11B illustrates another view of the example user interface of FIG. 10A.

In FIG. 11A the graphical chart display area 1002 illustrates data relating to items 1 through 12. In FIGS. 11A-11B the data analysis parameter selector 1004 for "impressions in thousands" has been selected and the time selector for "day" has been selected. The chart display area 1002 shows how many impressions per user in thousands were recorded for that day. The number of impressions are displayed in the graphical chart display area 1002 in the form of a bar graph. The title 1010 indicates that the dashboard 1000 is displaying "impressions by guests in thousands". Each bar 1012 represents the number of times each item was displayed on the website on that day.

FIG. 11B displays a view of the dashboard 1000 of FIG. 11A when the overlay sales data toggle 1008 has been turned on. A line graph 1014 represents the sales for each item on that day. Each point 1016 on the line graph 1014 illustrates the value for the sales laid over bars 612 of the bar graph for impressions by guests in thousands. As was discussed with earlier with respect to FIGS. 6A to 6B, overlaying a visualization of sales data with that of impressions data allows an administrative user to quickly evaluate which items displayed on a website results in the most conversions to sales. For example, in FIG. 11B, item 3 shows a good amount of sales compared to the number of impressions for that item on that day. Conversely, item 11 shows poor sales compared to number of impressions for that day. In some embodiments, an administrative user may opt to provide (at least for the users selected) item 11 as a recommended item on the website less often then item 3. In other embodiments, the administrative user A may adjust algorithms used to automatically generate item recommendations to users of the retail website.

Figure 12A:
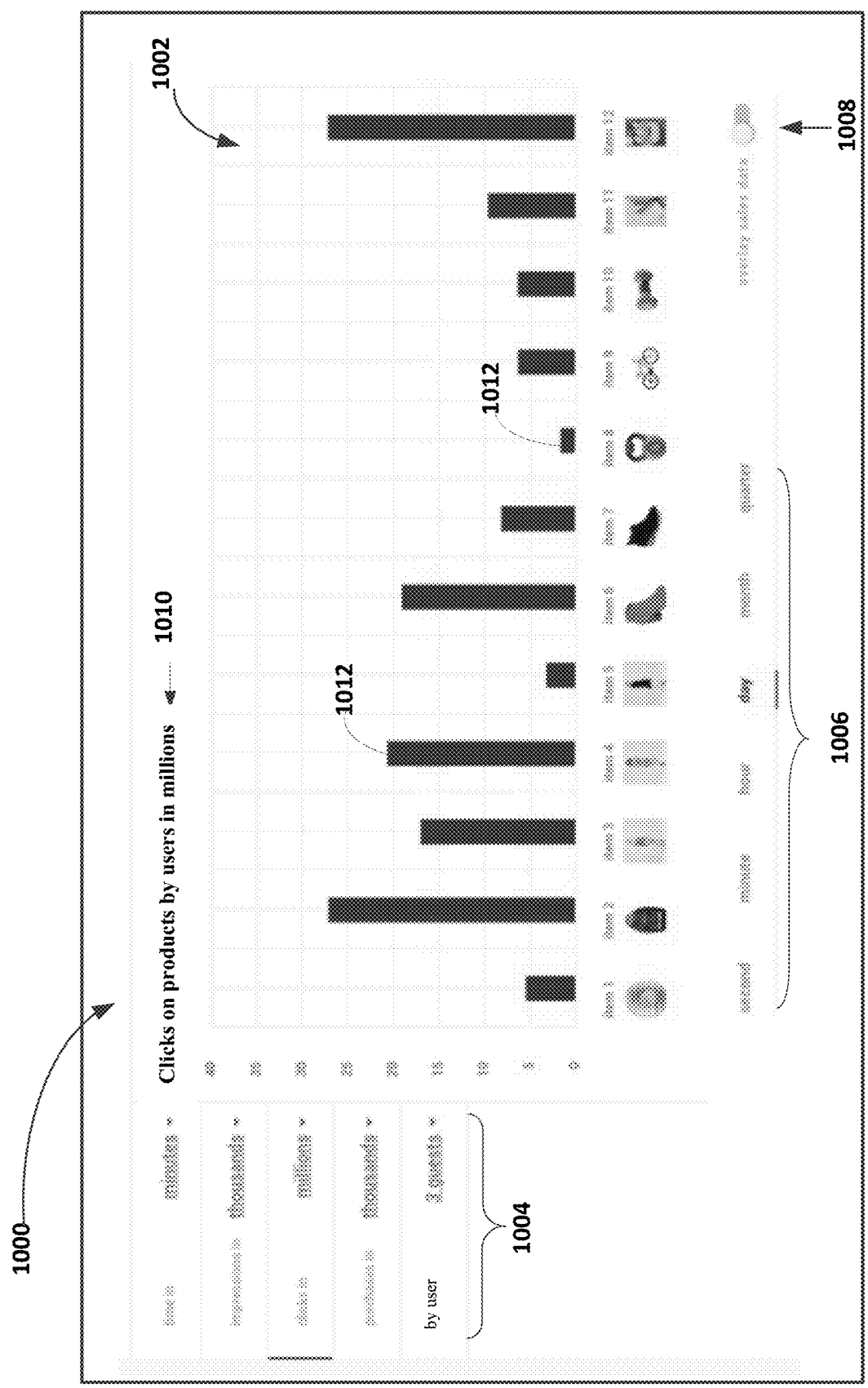
FIG. 12A illustrates another view of the example user interface of FIG. 10A.

FIG. 12A displays yet another view of the dashboard 1000 of FIG. 6A. In FIG. 12A, the data selector 1004 for "clicks in millions" has been selected. The time selector 1006 remains on "day". The overlay sales data toggle 1008 is turned to off. The title 1010 of the chart display area 1002 is "clicks on products by guests in millions." In this example, the bars 1012 of the bar graph displayed in the chart display area 1002 represent the number of times users of the retail website clicked each item.

Figure 12B:
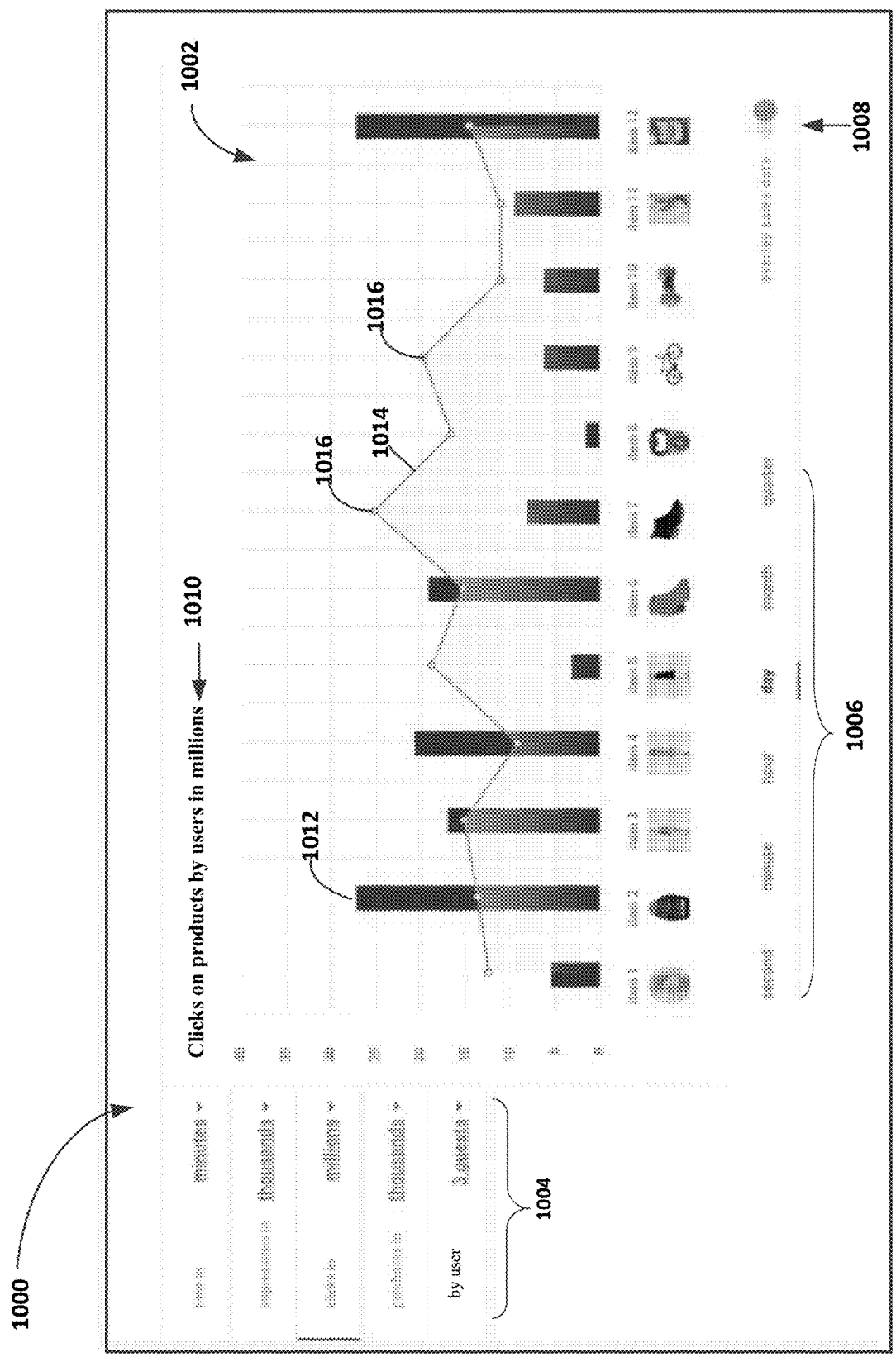
FIG. 12B illustrates another view of the example user interface of FIG. 10A.

FIG. 12B displays the dashboard 1000 of FIG. 12A after the overlay sales data toggle 1008 has been turned on. In this view, a line graph 1014 representing sales for each item on that day is displayed over the bar graph 1012 in the graphical chart display area 1002. Each point 1016 of the line graph represents sales and can be easily compared with each bar 1012 representing the number of clicks by users on the retail website.

Figure 13A:
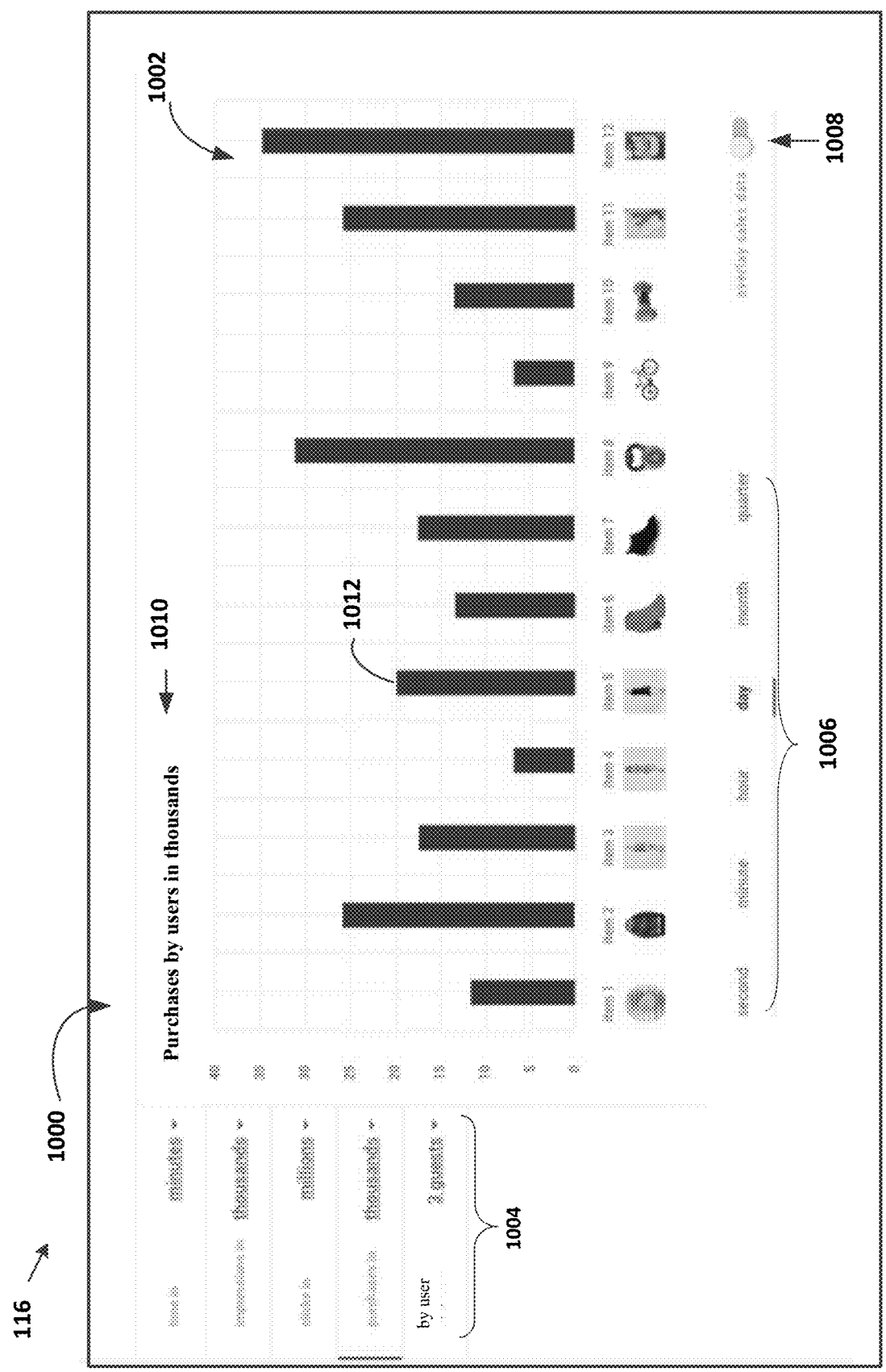
FIG. 13A illustrates another view of the example user interface of FIG. 10A.
Figure 13B:
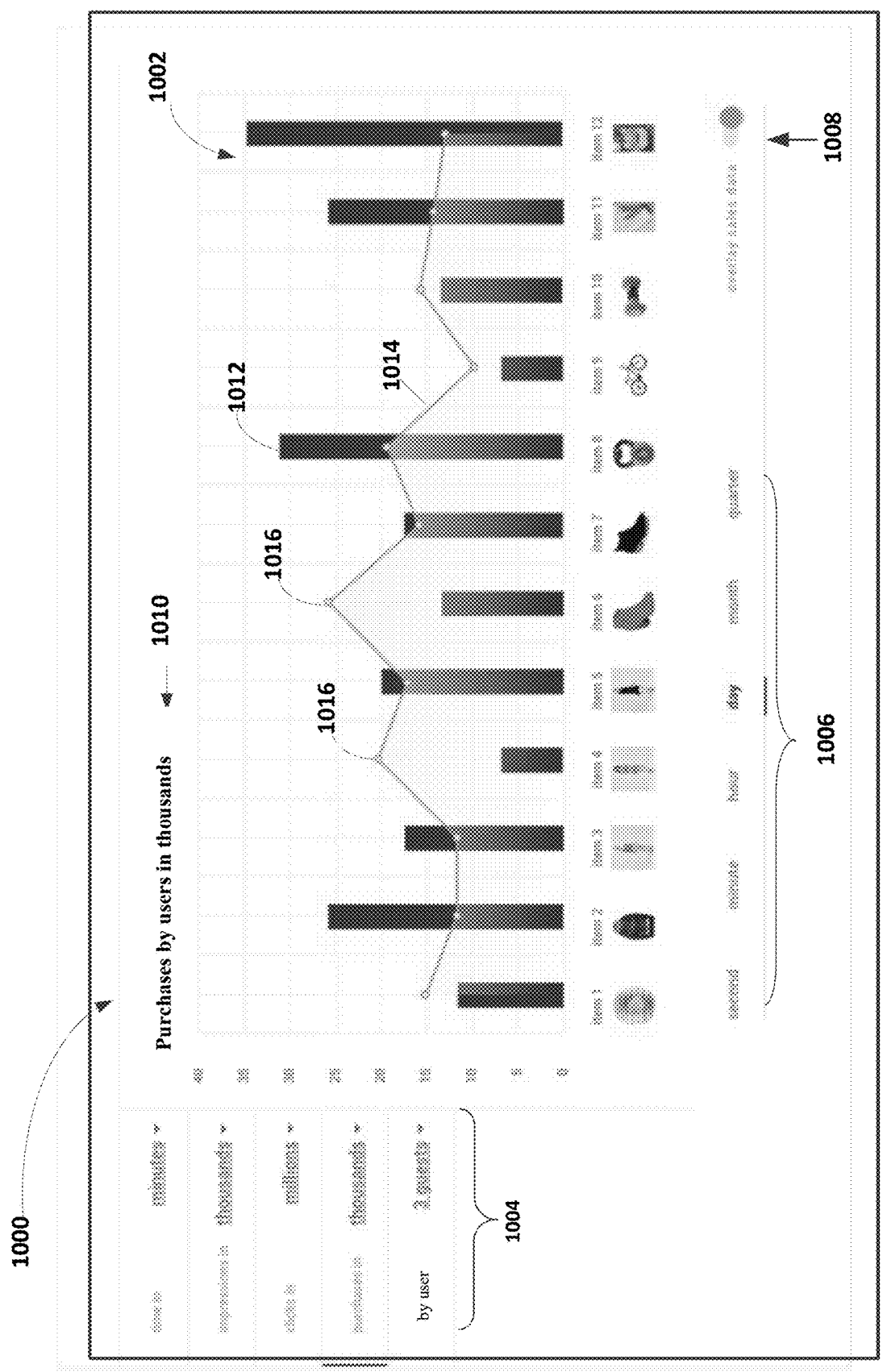
FIG. 13B illustrates another view of the example user interface of FIG. 10A.

FIGS. 13A-13B displays another view of the dashboard 1000 where the analysis parameter selector 1004 for "purchases in thousands" has been selected. The time selector 1006 remains on "day". The title 1010 of the chart display area 1002 is "clicks on products by guests in millions." In this example, the bars 1012 of the bar graph displayed in the chart display area 1002 represent the number of times users of the retail website purchased each item. FIG. 13A shows the dashboard 1000 with the overlay toggle 1008 turned off, and FIG. 13B shows the dashboard 1000 with the overlay toggle 1008 turned on. When the overlay toggle 1008 is turned on, a line graph 1014 representing sales data for each item on that day is displayed over the bar graph 1012 in the graphical chart display area 1002.

Figure 14A:
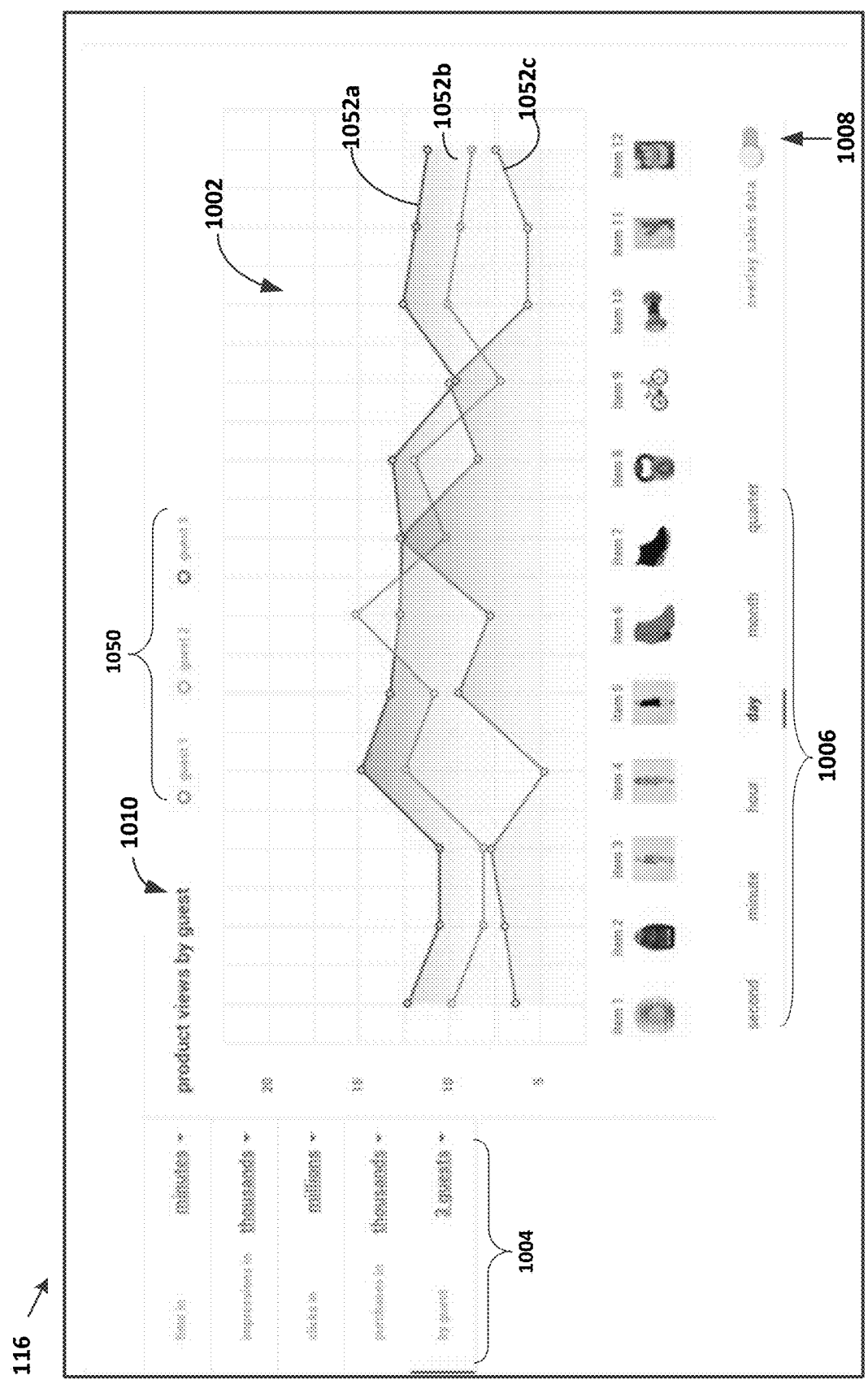
FIG. 14A illustrates another view of the example user interface of FIG. 10A.

FIG. 14A illustrates another example of the dashboard 1000. In this example, the chart display area 1002 displays three different line graphs 1052*a*, 1052*b*, 1052*c*. The analysis parameter selector 1004 for "by user" is selected. In the example of FIG. 14A, three guests have been selected. The time selector 1006 for "day" is selected. The title 1010 of the chart display area 1002 reads "product views by guest". The dashboard 1000 further includes chart labels 1050 for each guest (guest 1, guest 2, guest 3). The graphical chart display area 1002 displays a separate line graph 1052 for each of the three selected guests indicating how many times each guest viewed each of items 1 through 12.

Figure 14B:
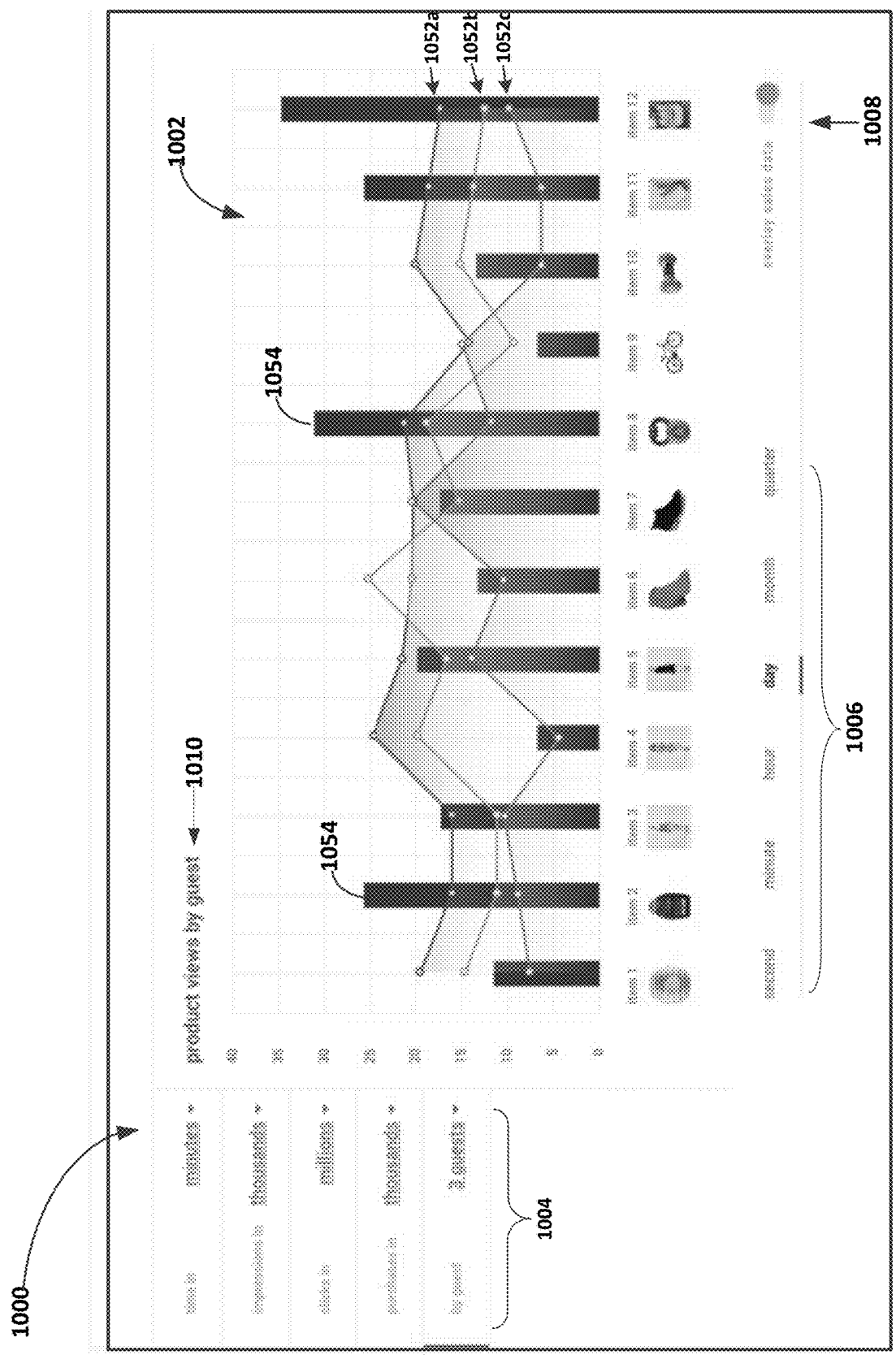
FIG. 14B illustrates another view of the example user interface of FIG. 10A.

Turning to FIG. 14B, the dashboard 1000 now displays a graphical chart display area 1002 that includes sales data. In this example, the overlay sales data toggle 1008 has been turned on and a bar graph is displayed where each bar 1054 represents total sales for each item on the day. The chart display area 602 displays both the bar graph for sales data and each of the three line graphs 1002 for the selected users. The display of individual product views by guest users compared to product sales allows for an administrative user to assess which items have the best conversion from product to use to sales and are thus the best items to recommend to those users.

User interfaces according to the present disclosure provide improvements over prior user interfaces used to analyze item recommendations in that more than one set of data can be viewed at the same time, allowing for faster and easier analysis of item recommendations. For example, item impressions can be directly compared with item sales for a given time period or for a given group of retail users. Multi-dimensional views of clickstream data make the item recommendation evaluation process simpler and faster.

In addition, the recommendation management user interface provides the benefit of updating automatically in real-time or near real-time as additional information about the item recommendations becomes available. Having up to date information about the performance of item recommendations allows administrator users to make changes to item recommendations that are presented on a retail web site very quickly and easily, thus avoiding the problem of presenting item recommendations that are not effective for a particular group of retailers. Quick decision making about which items to recommend to users on a retail website can greatly impact sales.

User interfaces according to the present disclosure can be used to observe habits and trends of users shopping on a retail website. Trends and popularity of particular items can be tracked over time. The influence of seasonality or holidays can be easily analyzed for particular items. This gives an administrator user a sense of how different users buy different things. For example, buying milk is in response to an immediate need and very little research involved. In contrast, buying a bookshelf is not urgent and a user may do more research before buying a more expensive item.

The recommendation management user interface is useful for analyzing display time of items in an item recommendation region, assessing user engagement with items presented in the item recommendation region, and determining a return on investment for an item. Data can be filtered based on location to examine geographic trends. The data can be filtered down to an individual user to determine if the 80/20 rules applies (i.e. if 20% of users are seeing 80% of the items available on the website). Data can also be filtered down to the individual user level to determine Generation of improved item recommendations provides greater efficiency to computing devices used to generate and host a website, as well as to computing device used to access the website. By providing more relevant item recommendations, fewer pages of the website need to be presented to a user in order to result in a purchase being made. A user will, on average, click fewer items and pages of a website in order to find relevant items to purchase. This reduces the processing burden of all computing devices involved.

Providing a user interface that visualizes data relating to user interactions with recommended items in direct comparison with sales data shown in the same view provides advantages over existing user interfaces. Previous user interfaces required a user to switch from multiple views of different data and try to piece different types of data together to evaluate the performance of item recommendations on a web site. This requires more time and clicks to interact with data from the website. The methods, systems, and user interfaces of the present disclosure provide improvements with regard to increased flexibility in viewing data, faster data comparisons, and near real-time data updates.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A system for evaluating item recommendations on a website, the system comprising:
 an enterprise web server configured to generate and maintain a web site accessible by a plurality of users, the enterprise web server comprising:

a website server configured to generate a user interface presentable to the plurality of users on the web site, the user interface including an item recommendation region presenting one or more items based on recommendations customized to each user visiting the web site;

a click analysis application configured to analyze clickstream data received from the one or more users to determine item preferences for at least some of the plurality of users;

an item recommendation generator configured to, in response to a request from each of a plurality of individual users for display of the user interface including the item recommendation region, generate item recommendations for presentation to the individual user within the item recommendation region based, at least in part, on the item preferences of the individual user; and a recommendation monitoring engine configured to:
generate a recommendation management user interface presentable to an administrator user different from the plurality of users, the recommendation management user interface including a graphical chart display area, a plurality of analysis parameter selectors, one or more time selectors, and an overlay selector;
receive selections of one or more of the plurality of analysis parameter selectors and at least one time selector for a period of time;
depict, at the graphical chart display area, a first visualization of a first set of numerical values for impressions or clicks for each of a plurality of items in the item recommendation region based on clickstream data generated over the selected period of time;
in response to receiving a selection of the overlay selector, displaying, at the graphical chart display area, an overlay of a second visualization of a second set of numerical values for sales of the plurality of items in the item recommendation region over the selected period of time;
in response to receiving new clickstream data, dynamically updating the graphical chart display area to reflect updated numerical values; and
in response to receiving at least one new selection of one of the plurality of analysis parameter selectors and the at least one time selector, updating the graphical chart display area to reflect updated numerical values.

2. The system of claim 1, wherein the plurality of analysis parameter selectors include a scale of number of impressions, a scale of number of clicks, a scale of number of purchases, and a selection of one or more users.

3. The system of claim 2, wherein the plurality of items presented in the recommendation management user interface includes items identified as being most frequently presented to users within the selected one or more users.

4. The system of claim 1, wherein the recommendation monitoring engine dynamically updates the recommendation management user interface in at least near-realtime.

5. The system of claim 1, wherein the enterprise web server includes a plurality of communicatively interconnected computing devices.

6. The system of claim 1, wherein the items included in the plurality of items includes at least one user-selectable item.

7. The system of claim 1, wherein at least a subset of the plurality of users are unknown to the enterprise web server and there is no item preference data for those users.

8. The system of claim 1, wherein at least a subset of the plurality of users are known to the enterprise web server and there is item preference data for those users.

9. The system of claim 7, wherein item recommendations are generated for an individual unknown user based at least in part on a context of the unknown user, where the context comprises one or more of a time, location, and device type.

10. The system of claim 1, further comprising an administration computing device comprising:
a processor; and
a system memory storing computer-readable software instructions that, when executed by the processor, cause the administration computing device to:
display on a recommendation management user interface, a dashboard comprising a plurality of data analysis parameter selectors, a plurality of time period selectors, an overlay selector, and a graphical chart display area;
receive, from an administrator user, selections of one or more of the plurality of data analysis parameter selectors and a time period selector;
select a subset of the plurality of items;
display, within the graphical chart display area, a first visual representation of impression, clickstream, or sales data corresponding to the selected data analysis parameters, time period, and subset of items;
in response to receiving a selection of an overlay selector, displaying, at the graphical chart display area, an overlay of a second visualization of impression, clickstream, or sales data;
dynamically update the graphical chart display area in response to new impression, clickstream, and sales data as it is received; and
in response to receiving at least one new selection of one of the plurality of data analysis parameter selectors and the time period selector, updating the graphical chart display area to reflect updated numerical values for the impression, clickstream, or sales data.

11. The system of claim 10, wherein selection of the overlay selector causes sales data to be displayed over the first visual representation.

12. The system of claim 10, wherein the first visual representation is a first chart type selected from the group consisting of a scatter plot, a histogram, a bar graph, and a line graph.

13. The system of claim 10, wherein the second visual representation is a second chart type selected from the group consisting of a scatter plot, a histogram, a bar graph, and a line graph, where the second chart type is different from the first chart type.

14. The system of claim 1, wherein the overlay selector is a toggle that turns and off display of sales data in the second visualization.

* * * * *